US012421060B2

(12) United States Patent
Kamichi

(10) Patent No.: US 12,421,060 B2
(45) Date of Patent: Sep. 23, 2025

(54) BYPASS FEEDER AND IMAGE FORMING APPARATUS

(71) Applicant: Junpei Kamichi, Tokyo (JP)

(72) Inventor: Junpei Kamichi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 42 days.

(21) Appl. No.: 18/597,681

(22) Filed: Mar. 6, 2024

(65) Prior Publication Data

US 2024/0308796 A1 Sep. 19, 2024

(30) Foreign Application Priority Data

Mar. 13, 2023 (JP) ................................ 2023-038675

(51) Int. Cl.
*B65H 1/04* (2006.01)
*G03G 15/00* (2006.01)

(52) U.S. Cl.
CPC ........... *B65H 1/04* (2013.01); *G03G 15/6514* (2013.01); *B65H 2402/31* (2013.01); *B65H 2402/442* (2013.01)

(58) Field of Classification Search
CPC .. B65H 1/04; B65H 2402/31; B65H 2402/33; B65H 2402/35; B65H 2402/45; B65H 2402/441; B65H 2402/442; B65H 2405/12; B65H 2405/121; B65H 2405/32; B65H 2405/321; B65H 2405/324; G03G 15/6514; G03G 2215/00392; G03G 21/1623; G03G 21/1628; G03G 21/1633; G03G 21/1638; G03G 21/1647; G03G 21/1695
See application file for complete search history.

(56) References Cited

U.S. PATENT DOCUMENTS 9,037,073 B2 * 5/2015 Aoyama ............ G03G 21/1695 399/392
9,725,260 B2 * 8/2017 Furusawa ............ B65H 3/0607
11,609,527 B2 * 3/2023 Oshiro ...................... B41J 29/13
12,140,897 B2 * 11/2024 Kakuta ............. G03G 15/6514
2014/0212195 A1 7/2014 Aoyama
2015/0001794 A1 * 1/2015 Doi ......................... B65H 1/04 271/145
2017/0227911 A1 8/2017 Kuno et al.
2017/0320687 A1 11/2017 Kamichi
2019/0243296 A1 8/2019 Shiga et al.
2021/0155426 A1 5/2021 Kamichi

FOREIGN PATENT DOCUMENTS

JP 2014-144868 A 8/2014
JP 2018-039677 A 3/2018

* cited by examiner

*Primary Examiner* — Ernesto A Suarez
(74) *Attorney, Agent, or Firm* — Duft & Bornsen, PC

(57) ABSTRACT

A bypass feeder for feeding a sheet to an apparatus includes an openable member, a bypass feeding tray, and a linear member. The openable member is to be attached to the apparatus such that an upper portion of the openable member opens and closes. The bypass feeding tray is attached to the openable member such that an upper portion of the bypass feeding tray opens and closes. The linear member has a first end held by a first end holder of the bypass feeding tray and a second end held by a second end holder of the apparatus. The linear member has a portion accommodated inside the bypass feeding tray when the bypass feeding tray is open. The portion ranges from the first end to an inside of the apparatus or an inside of the openable member.

11 Claims, 19 Drawing Sheets

BYPASS FEEDER AND IMAGE FORMING APPARATUS

CROSS-REFERENCE TO RELATED APPLICATION

This patent application is based on and claims priority pursuant to 35 U.S.C. § 119(a) to Japanese Patent Application No. 2023-038675, filed on Mar. 13, 2023, in the Japan Patent Office, the entire disclosure of which is hereby incorporated by reference herein.

TECHNICAL FIELD

Embodiments of the present disclosure relate to a bypass feeder and an image forming apparatus.

RELATED ART

A bypass feeder has been known that feeds a sheet placed on a bypass feeding tray to a sheet conveyance path of a main apparatus.

For example, a bypass sheet feeder has been known that includes an openable member for opening a sheet conveyance path of an image forming apparatus main body (main apparatus) and a bypass feeding tray openably and closably attached to the openable member. In the bypass sheet feeder, the openable member has an upper portion that turns around a pivot at a lower portion of openable member to open and close relative to the image forming apparatus main body. The openable member is opened to open the sheet conveyance path so that a sheet jammed in the sheet conveyance path is unjammed. The bypass feeding tray has an upper portion that turns around a pivot at a lower portion of the bypass feeding tray to open and close with respect to the openable member. When the bypass feeding tray is opened, the placement face of the bypass feeding tray is kept in a predetermined upward inclination state in which the upper portion of the bypass feeding tray (the end located upward in the vertical direction with the bypass feeding tray closed) is higher than the lower portion of the bypass feeding tray, so that the sheet placed on the placement face can be fed.

In this type of bypass sheet feeder, when the openable member is opened while a sheet is placed on the bypass feeding tray remaining open, the bypass feeding tray turns accordingly. The placement face of the bypass feeding tray is in a downward inclination state in which the upper portion of the bypass feeding tray is lower than the lower portion, so that the sheet disadvantageously slides off the bypass feeding tray. In order to solve this disadvantage, the bypass sheet feeder is provided with a wire (linear member) having one end and the other end. The one end is held inside the bypass feeding tray and the other end is held by a link member (second end holder) linking the openable member with the main apparatus such that the openable member is openable and closable. In this bypass sheet feeder, when the openable member shifts from a closed state to an open state with the bypass feeding tray open, the other end of the wire is pulled by the link member, so that a position securing part with which a wire portion in the bypass feeding tray is provided abuts on a stopper in the bypass feeding tray. With this arrangement, due to the tension of the wire, the turning of the bypass feeding tray along with the opening of the openable member is prevented. As a result, even if the openable member is opened with the bypass feeding tray open, the placement face of the bypass feeding tray is kept in a substantially horizontal state, so that the disadvantage in that the sheet slides off the bypass feeding tray is solved. However, since a portion of the linear member of such a bypass feeder is located outside the main apparatus when the bypass feeding tray is open, the portion of the linear member may touch a person or an object.

SUMMARY

According to an embodiment of the present disclosure, a bypass feeder for feeding a sheet to an apparatus includes an openable member, a bypass feeding tray, and a linear member. The openable member is to be attached to the apparatus such that an upper portion of the openable member opens and closes. The bypass feeding tray is attached to the openable member such that an upper portion of the bypass feeding tray opens and closes. The linear member has a first end held by a first end holder of the bypass feeding tray and a second end held by a second end holder of the apparatus. The linear member has a portion accommodated inside the bypass feeding tray when the bypass feeding tray is open. The portion ranges from the first end to an inside of the apparatus or an inside of the openable member.

According to another embodiment of the present disclosure, an image forming apparatus includes the bypass feeder.

BRIEF DESCRIPTIONS OF THE DRAWINGS

A more complete appreciation of embodiments of the present disclosure and many of the attendant advantages and features thereof can be readily obtained and understood from the following detailed description with reference to the accompanying drawings, wherein.

Figure 1:
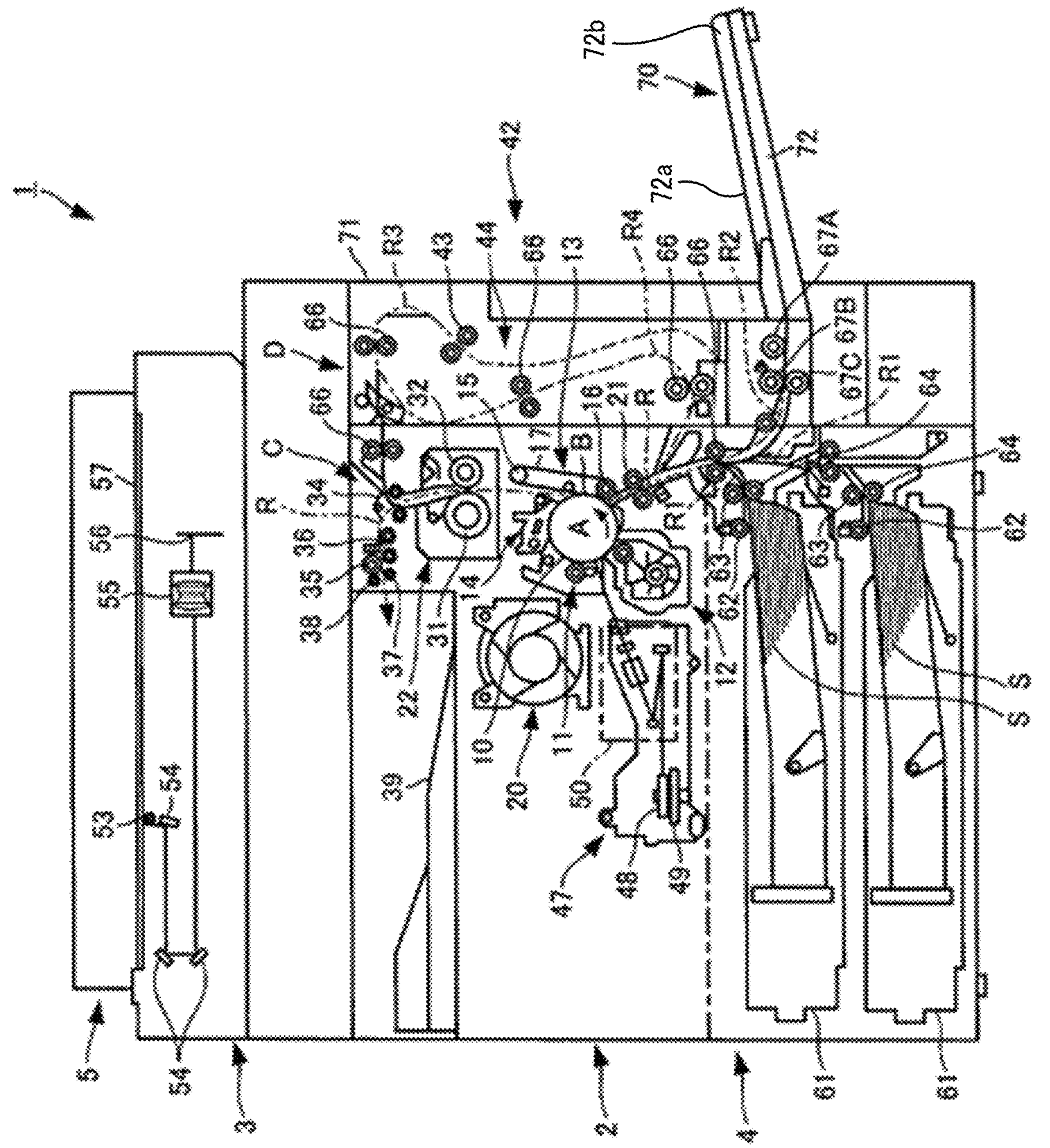
FIG. 1 is a schematic view of a schematic configuration of a copier as an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, described will be an example in which a bypass feeder according to an embodiment of the present disclosure is applied to a copier serving as an image forming apparatus.

FIG. 1 is an explanatory view of a schematic configuration of the copier according to the present embodiment.

A copier 1 of the present embodiment includes an image forming apparatus main body 2 as a main apparatus, an image reading device 3, a sheet feeder 4, and an automatic document conveyor 5. The image reading device 3 is disposed on the image forming apparatus main body 2. The sheet feeder 4 having a table-like shape is disposed below the image forming apparatus main body 2. The automatic document conveyor 5 is openably and closably disposed on the image reading device 3. Further, the copier 1 includes a switchback device 42 and a bypass sheet feeder 70.

The image forming apparatus main body 2 includes a drum-shaped photoconductor 10 serving as an image bearer inside the image forming apparatus main body 2. A charging device 11 is disposed on the left side in the figure around the photoconductor 10. A developing device 12, a transfer device 13, and a cleaning device 14 are disposed along the rotational direction of the photoconductor 10 (counterclockwise direction: arrow A in the figure). The transfer device 13 includes an upper roller 15, a lower roller 16, and a transfer belt 17 stretched around the upper roller 15 and the lower roller 16. The transfer belt 17 is pressed against the circumferential face of the photoconductor 10 at a transfer position B.

A toner supplying device 20 is disposed on the left side of the charging device 11 and the cleaning device 14. The toner supplying device 20 supplies new toner to the developing device 12. Further, a sheet conveyor C is disposed inside the image forming apparatus main body 2. The sheet conveyor C sends a sheet such as paper or an overhead projector (OHP) sheet, from a feeding position to be described below, and conveys the sheet to a stacking position through the transfer position B. The sheet conveyor C includes a feeding path R1, a bypass feeding path R2, and a sheet conveyance path R to be described below. The sheet conveyance path R has a substantially L shape passing between the photoconductor 10 and the transfer device 13 and extending upward from a lower side, and then bending left in the figure.

The sheet conveyance path R includes a registration roller 21 disposed upstream of the photoconductor 10 in the sheet conveyance direction. Further, a fixing device 22 is disposed downstream of the photoconductor 10 in the sheet conveyance direction. The fixing device 22 includes a pair of fixing rollers (fixing roller rotary bodies) 31 and 32. A fixing heater is disposed inside the fixing roller 31. A pressure spring and a pressure arm are disposed around the fixing roller 32. The pressure spring and the pressure arm cause the fixing roller 32 to press the fixing roller 31. Further, a thermistor and a thermostat are disposed to the fixing roller 31. The fixing heater uses the thermistor to measure the temperature of the fixing roller 31, and uses the thermostat to turn on or off the fixing heater to keep the fixing rollers 31 at a predetermined temperature.

An ejection bifurcating claw 34, an ejection roller 35, a first pressure roller 36, a second pressure roller 37, and a stiffening roller 38 are disposed further downstream of the sheet conveyance direction of the fixing device 22. An ejection stacking portion (ejection position) 39 for stacking a sheet on which an image has been formed is disposed furthermore downstream of the fixing device 22 in the sheet conveyance direction.

A laser writing device 47 is disposed on the left side of the developing device 12 in the figure. The laser writing device 47 includes a laser light source, a rotary polygon mirror 48 for scanning, a polygon motor 49, and a scanning optical system 50 such as an fθ lens.

The image reading device 3 includes a light source 53, a plurality of mirrors 54, an imaging optical lens 55, and an image sensor 56 such as a charge coupled device (CCD). The image reading device 3 has an upper face on which an exposure glass 57 is disposed.

The automatic document conveyor 5 has one end coupled to one end of the upper face of the image reading device 3 through a coupling part having a hinge structure. The automatic document conveyor 5 is openable and closable from a horizontal state where the lower face of the automatic document conveyor 5 presses on a document sheet placed on the upper face of the exposure glass 57 to a state where the automatic document conveyor 5 opens up to the inclination angle of 90 degrees to the upper face of the exposure glass 57. The automatic document conveyor 5 includes a placement table at the document placement position, an ejection table at the document ejection position, and a sheet conveyor having a document conveyance path through which a sheet such as a document is conveyed from the placement table to the ejection table through the reading position on the exposure glass 57 of the image reading device 3. The sheet conveyor includes a plurality of sheet conveyance rollers (sheet conveyance rotary bodies) to covey a sheet such as a document.

The sheet feeder 4 includes sheet separation devices 61 in multiple stages. The sheet separation devices 61 each include a pickup roller (feeding roller) 62, a feed roller (feeding roller) 63, and a reverse roller (separation roller) 64. The feeding path R1 is defined on the right side of the sheet separation devices 61 in multiple stages in the figure. The feeding path R1 extends to the sheet conveyance path R of the image forming apparatus main body 2. The feeding path R1 includes sheet conveyance rollers 66 (sheet conveyance rotary bodies) to convey a sheet.

The switchback device 42 is disposed on the right side of the image forming apparatus main body 2 in the figure. The switchback device 42 includes a sheet conveyor D that bifurcates from the position of the ejection bifurcating claw 34 in the sheet conveyance path R. The sheet conveyor D includes a reverse path R3 and a reconveyance path R4. The reverse path R3 extends to lead a sheet to a switchback position 44 at which a pair of switchback rollers 43 is disposed. The reconveyance path R4 extends to lead the sheet from the switchback position 44 to the registration roller 21 in the sheet conveyance path R. Further, the sheet conveyor D includes a plurality of sheet conveyance rollers 66 (sheet conveyance rotary bodies) to convey the sheet. In the present embodiment, the switchback device 42 is attached to an openable member 71 to be described below.

The bypass sheet feeder 70 is disposed on the right side of the image forming apparatus main body 2 in the figure. The bypass sheet feeder 70 includes a pickup roller (feeding roller) 67A, a feed roller (feeding roller) 67B, and a reverse roller (feeding roller) 67C, and feeds a sheet S placed on a sheet placement face 72*a* that the bypass feeding tray 72 has to the sheet conveyance path R of the image forming apparatus main body 2.

Next, a description is given of operations performed by the copier 1.

First, in order to generate a copy with the copier 1, the main switch of the copier 1 is turned on and a document is set on the automatic document conveyor 5. Alternatively, the automatic document conveyor 5 is opened to set a document on the exposure glass 57 of the image reading device 3, and then the automatic document conveyor 5 is closed to press the document. Then, in the case where the document is set on the automatic document conveyor 5, as the start switch of the copier 1 is pressed, the document is conveyed by the sheet conveyance rollers through the document conveyance path onto the exposure glass 57. Then, the image reading device 3 is driven to read the details of the document before the document is ejected onto the ejection table. However, in the case where the document is placed on the exposure glass 57, the image reading device 3 is driven immediately.

As the image reading device 3 starts driving, the light source 53 moves along the exposure glass 57 while emitting light, so that the light is emitted onto the face of the document placed on the exposure glass 57. The plurality of mirrors 54 receives reflected light from the face of the document and reflects the received light toward the imaging optical lens 55. The imaging optical lens 55 focuses the reflected light on the image sensor 56. As a result, the image sensor 56 reads the details of the document.

Meanwhile, in the image forming apparatus main body 2, the photoconductor 10 is rotated by a photoconductor drive motor, and accordingly, the surface of the photoconductor 10 is uniformly charged by the charging device 11 with a charging roller. Then, in accordance with the details of the document read by the image reading device 3, the laser writing device 47 irradiates the surface of the photoconductor 10 with light to perform writing on the surface of the photoconductor 10. As a result, an electrostatic latent image is formed on the surface of the photoconductor 10. Then, in a development region where an electrostatic latent image portion on the surface of the photoconductor 10 faces the developing device 12, toner is attached to the surface of the photoconductor 10 to visualize the electrostatic latent image.

In response to pressing of the start switch, the corresponding sheet separation device 61 is selected from the sheet separation devices 61 in multiple stages in the sheet feeder 4 on the basis of a sheet-size selection signal. Then, the pickup roller 62 corresponding to the selected sheet separation device 61 sends a single sheet S in the sheet separation device 61. When a plurality of sheets S is about to be sent, the reverse roller 64 separates the uppermost sheet S to prevent conveyance of the other sheets S. Subsequently, while conveying the uppermost sheet S, the feed roller 63 sends the sheet S into the feeding path R1. Then, the sheet conveyance rollers 66 take over the conveyance of the sheet S to lead the sheet S into the sheet conveyance path R. The registration roller 21 abuts on the sheet S to stop the conveyance of the sheet S. Then, the registration roller 21 rotates in synchronization with the rotation of the photoconductor 10, and sends the sheet S to the transfer position B on the right side of the photoconductor 10 in the figure.

In order to perform bypass sheet feeding, in the bypass sheet feeder 70, the bypass feeding tray 72 is opened from a state in which the bypass feeding tray 72 is closed (a state in which the bypass feeding tray 72 is in an upright posture). As a result, as illustrated in FIG. 1, the bypass feeding tray 72 takes a use posture with the sheet placement face 72*a* kept in a predetermined upward inclination state in which the leading end 72*b* of the bypass feeding tray 72 (the end located vertically upward with the bypass feeding tray 72 closed) is located higher than a portion excluding the leading end 72*b* of the bypass feeding tray 72. When sheets are set on the sheet placement face 72*a* of the bypass feeding tray 72 in the use posture and the start switch is pressed, the pickup roller 67A sends a single sheet, and the feed roller 67B takes over the feeding of the sheet. When a plurality of sheets S is about to be sent, the reverse roller 67C separates the uppermost sheet to prevent conveyance of the other sheets. The sheet conveyance rollers 66 continues to convey the sheet supplied to the bypass feeding path R2 to lead the sheet into the sheet conveyance path R. Then, similarly to the sheet feeder 4 described above, the registration roller 21 sends the sheet to the transfer position B in synchronization with the rotation of the photoconductor 10.

Next, in response to reach of the sheet S to the transfer position B, the transfer device 13 transfers the toner image on the photoconductor 10 to the sheet S to form an image. The cleaning device 14 removes and cleans the residual toner on the photoconductor 10 after the image transfer. Then, a static eliminator removes the residual potential on the photoconductor 10 so as to prepare next image formation that starts with the charging device 11.

With the transfer belt 17, the fixing device 22 conveys the sheet S on which the toner image is transferred, passes the sheet S between the pair of fixing rollers 31 and 32, and applies heat and pressure at the fixing position to fix the toner image on the sheet S. Then, the fixed sheet S is stiffened to be flat in passing the first pressure roller 36, the ejection roller 35, the second pressure roller 37, and the stiffening roller 38. The sheet S is ejected onto the ejection stacking portion 39 and stacked on the ejection stacking portion.

Note that the ejection bifurcating claw 34 is switched for image transfer onto both sides of the sheet S. Then, the fixed sheet S having a first face on which the image is transferred is led from the sheet conveyance path R into the reverse path R3. The sheet S is conveyed by the sheet conveyance rollers 66 to the switchback position 44, and switched back at the switchback position 44. Then, the sheet S is led into the reconveyance path R4 to be reversed. The sheet S is conveyed by the sheet conveyance rollers 66 to the sheet conveyance path R again. Then, similarly as described above, an image is transferred onto a second face (back face) that the sheet S has.

Next, the configuration and operations of the bypass sheet feeder 70 will be described.

Figure 2:
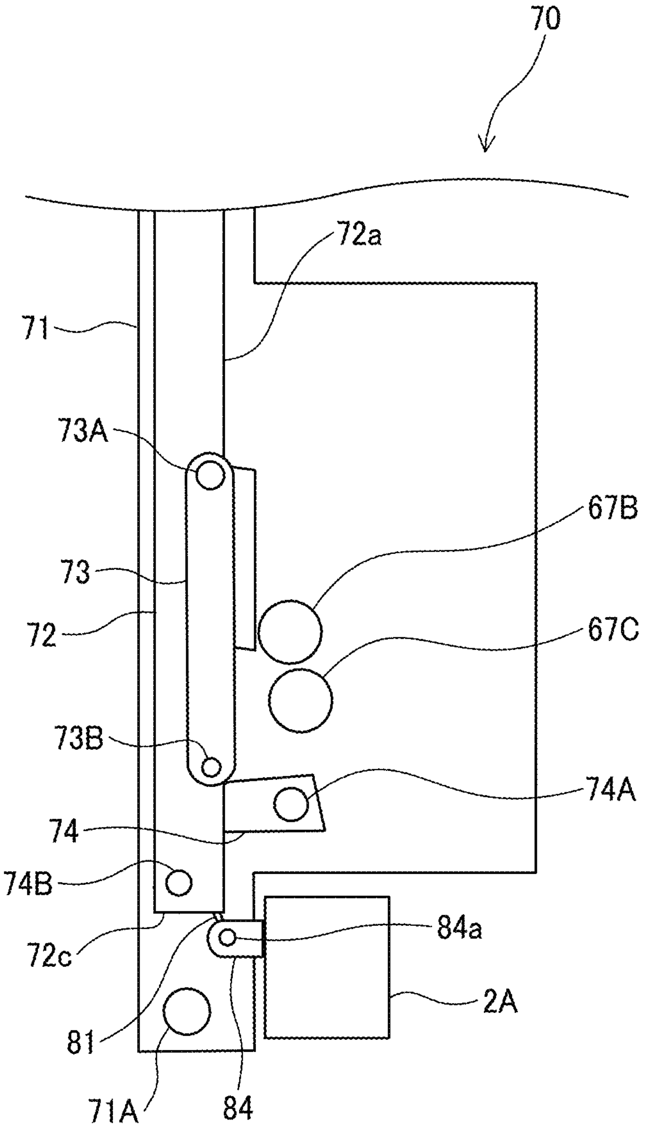
FIG. 2 is a schematic view of a bypass sheet feeder with an openable member closed and with a bypass feeding tray closed at the copier.

FIG. 2 is an explanatory view schematically illustrating a configuration of the bypass sheet feeder 70 with the openable member closed and with the bypass feeding tray 72 closed.

Figure 3:
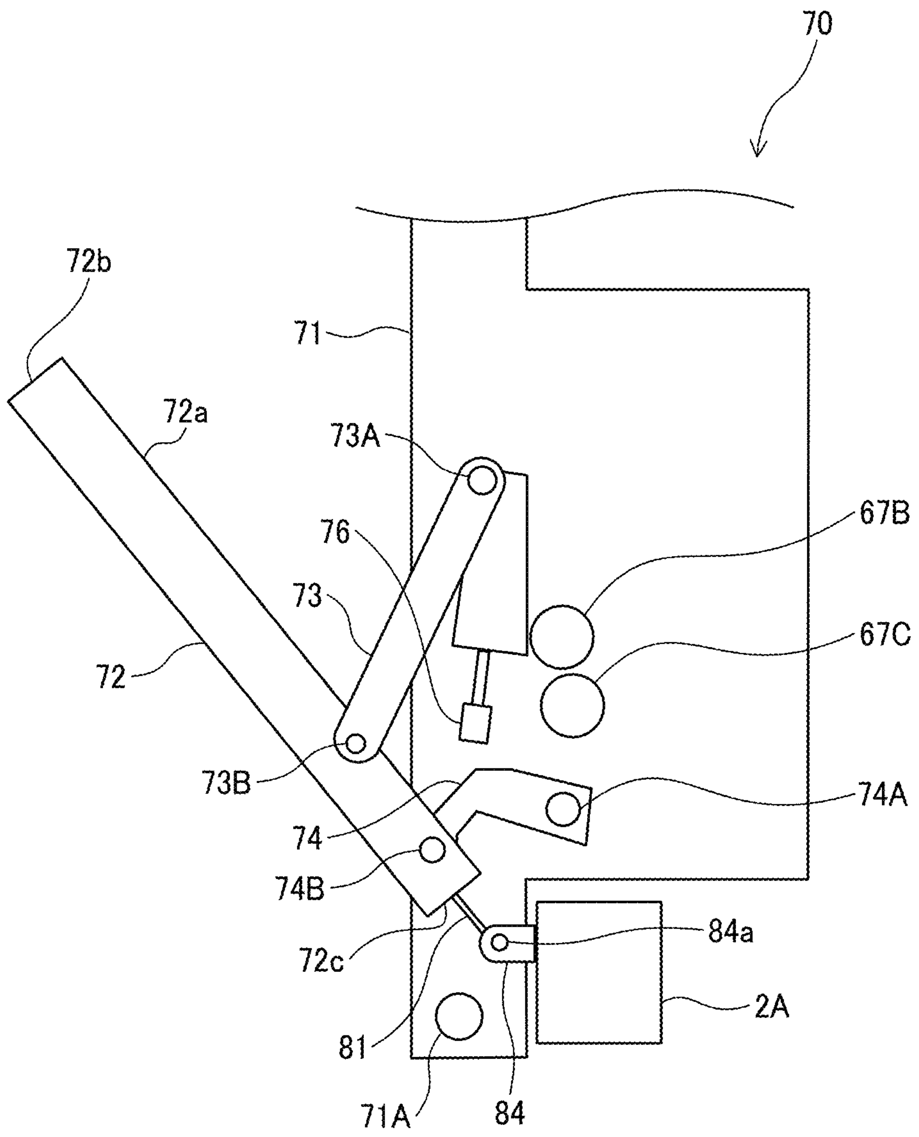
FIG. 3 is a schematic view of the bypass sheet feeder with the openable member closed and with the bypass feeding tray partially open at the copier.

FIG. 3 is an explanatory view schematically illustrating a configuration of the bypass sheet feeder 70 with the openable member closed and with the bypass feeding tray 72 partially open.

Figure 4:
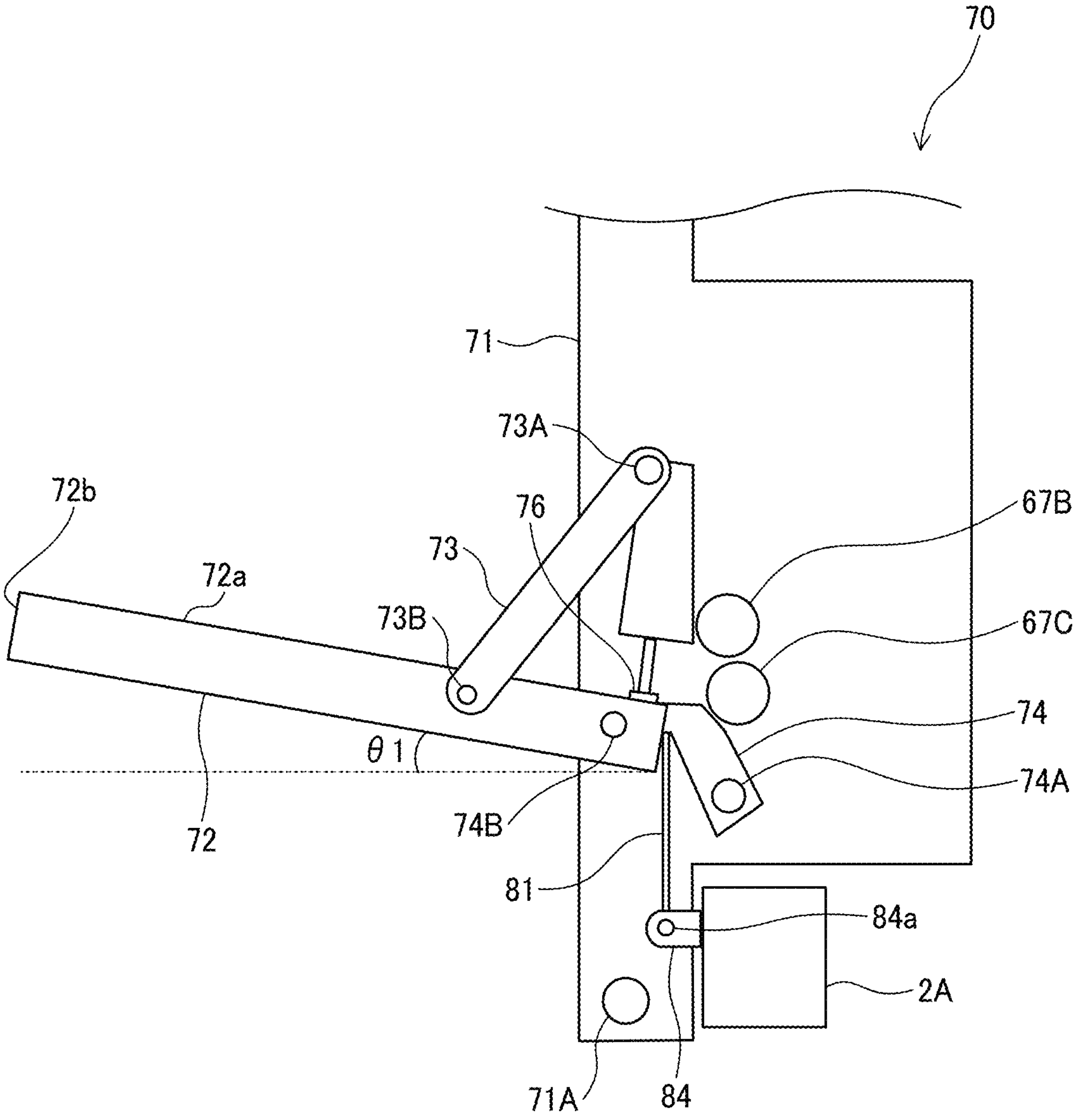
FIG. 4 is a schematic view of the bypass sheet feeder with the openable member closed and with the bypass feeding tray completely opened at the copier.

FIG. 4 is an explanatory view schematically illustrating a configuration of the bypass sheet feeder 70 with the openable member closed and with the bypass feeding tray 72 completely open.

The bypass sheet feeder 70 includes the openable member 71 having a support shaft 71A, the bypass feeding tray 72, two link members 73 and 74, and a wire 81. The openable member 71 is attached to the image forming apparatus main body 2 such that the openable member is rotatable about the support shaft 71A to open or close an upper portion of the openable member with respect to the image forming apparatus main body 2. The bypass feeding tray 72 is attached to the openable member 71 such that an upper portion (the leading end 72*b*) of the bypass feeding tray 72 opens and closes with respect to the openable member 71. The link members 73 and 74 link the openable member 71 and the bypass feeding tray 72. The wire 81 is a linear member having flexibility.

In order to facilitate, for example, removal of a sheet jammed in the sheet conveyance path R and the reconveyance path R4 (unjamming), and maintenance of the inside of the image forming apparatus main body 2, the openable member 71 closed in the upright posture is changed to the open state in an inclination posture (see FIGS. 2 to 4), and the sheet conveyance path R and the reconveyance path R4 are opened. This arrangement facilitates, for example, the unjamming and the maintenance.

At the bypass sheet feeder 70, the bypass feeding tray 72 closed in the upright posture (see FIG. 2) is changed to the open state in the inclination posture (see FIG. 4) such that the sheet placement face 72*a* is in an upward inclination state in which the leading end 72*b* of the bypass feeding tray 72 is higher than a portion excluding the leading end 72*b* of the bypass feeding tray 72. Placement of a sheet on the sheet placement face 72*a* in the upward inclination state allows the sheet for bypass feeding to be fed from the bypass feeding tray 72 to the sheet conveyance path R.

The link members 73 and 74 include a first link member 73 and a second link member 74, respectively. The link member 73 has one end and the other side. The one end of the first link member 73 is turnably attached to a pivot 73A with which the openable member 71 is provided. The other end of the first link member 73 is turnably attached to a pivot 73B with which the bypass feeding tray 72 is provided. Further, the second link member 74 has one and the other end. The one end of the second link member 74 is turnably attached to a pivot 74A with which the openable member 71 is provided. The other end of the second link member 74 is turnably attached to a pivot 74B with which the bypass feeding tray 72 is provided. The pivot 74B of the second link member 74 is provided near a lower portion (base end 72*c*) of the bypass feeding tray 72. The pivot 73B of the first link member 73 is provided at a portion closer to the leading end 72*b* than the base end 72*c* of the bypass feeding tray 72 is.

In order to bring the bypass feeding tray 72 into the open state (see FIG. 4) from the closed state (see FIG. 2) with such link members 73 and 74, the bypass feeding tray 72 turns about the pivot 73B of the first link member 73 while the base end 72*c* of the bypass feeding tray 72 is lifted upward due to turning of the second link member 74 about the pivot 74A. Then, with the bypass feeding tray 72 open (see FIG. 4), the base end 72*c* of the bypass feeding tray 72 abuts on a tray stopper 76, and the bypass feeding tray 72 cannot be further turned. As a result, the bypass feeding tray 72 is kept in the open state (the sheet placement face 72*a* is kept in an upward inclination state in which the leading end 72*b* of the bypass feeding tray 72 is located higher than the portion excluding the leading end 72*b* of the bypass feeding tray 72). An angle formed by the sheet placement face 72*a* and the horizontal plane at this time is defined as $\theta 1$.

Figure 5:
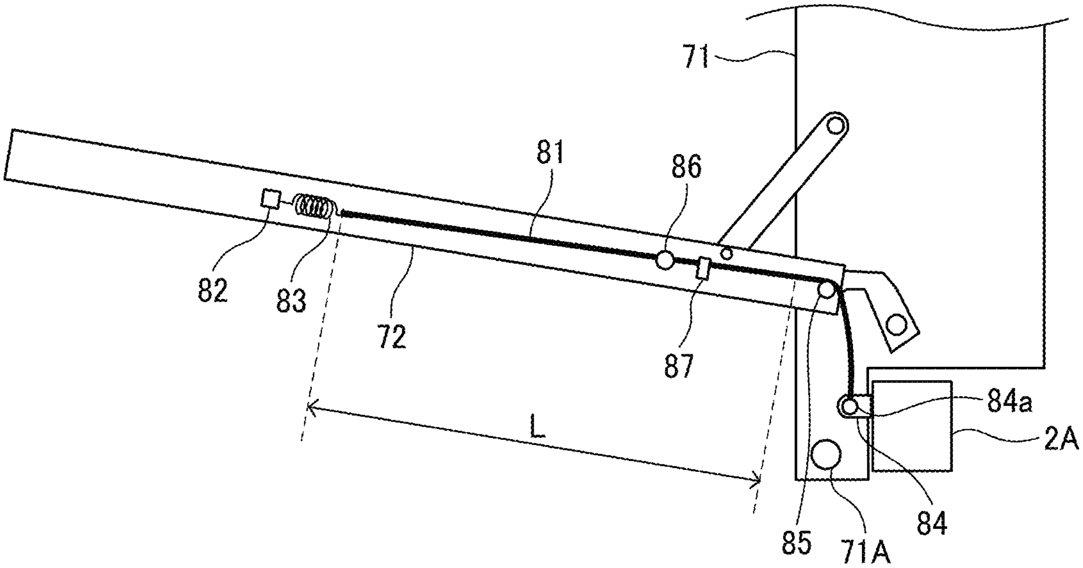
FIG. 5 is a cross-sectional view of the disposition of a wire of the bypass sheet feeder.

FIG. 5 is a cross-sectional view schematically illustrating the disposition of the wire 81 in the present embodiment.

Figure 6:
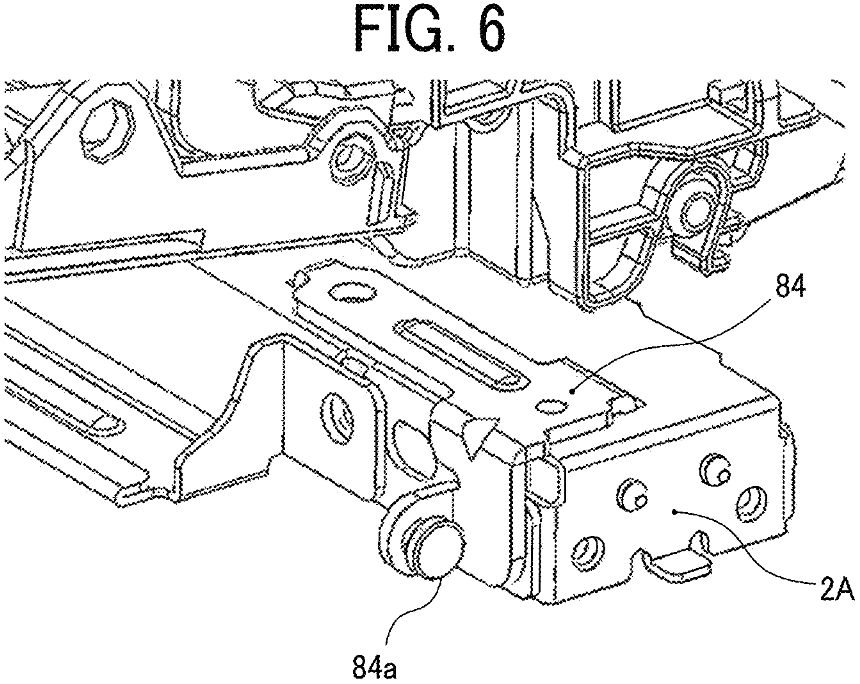
FIG. 6 is a perspective view of a wire bracket holding the other end of the wire.

The wire 81 is disposed at a position close to the rear side of the image forming apparatus main body 2 in the front-rear direction of the image forming apparatus main body 2. The wire has one end and the other end. The one end of the wire 81 is held by a wire holder 82 as a first end holder disposed inside the bypass feeding tray 72 through a tension spring 83 as a tension member. The other end of the wire 81 is held by a wire bracket 84 as a second end holder of the image forming apparatus main body 2. As illustrated in FIG. 6, the wire bracket 84 is attached to a stay member 2A as a structure of the image forming apparatus main body 2. The wire bracket 84 has a boss 84*a* to which the other end of the wire 81 is attached. Note that the stay member 2A is a member attached between the main body side plates of the image forming apparatus main body 2 below the feed roller 67B and the reverse roller 67C of the bypass sheet feeder 70.

The wire 81 of the present embodiment has a wire portion L accommodated in the bypass feeding tray 72, with the bypass feeding tray 72 open. The wire portion L at least ranges from the one end held by the wire holder 82 through the tension spring 83 to the inside of the image forming apparatus main body 2 or the inside of the openable member 71. With this arrangement, all or most of the portion of the wire 81 disposed outside the image forming apparatus (a region outside the outer wall face of the image forming apparatus main body 2 or the outer wall face of the openable member 71) is hidden in the bypass feeding tray 72. Thus, the wire 81 is less likely to be noticed by the user, resulting in reduction of a disadvantage that the aesthetic appearance is impaired due to expose of the wire 81 to the outside of the apparatus. Further, reduced can be a disadvantage that damage occurs due to touch of the wire 81 by a person or an object. Note that part of the wire portion L accommodated in the bypass feeding tray 72 may be visually recognizable from the outside through, for example, a window or a hole of the bypass feeding tray 72.

Figure 7:
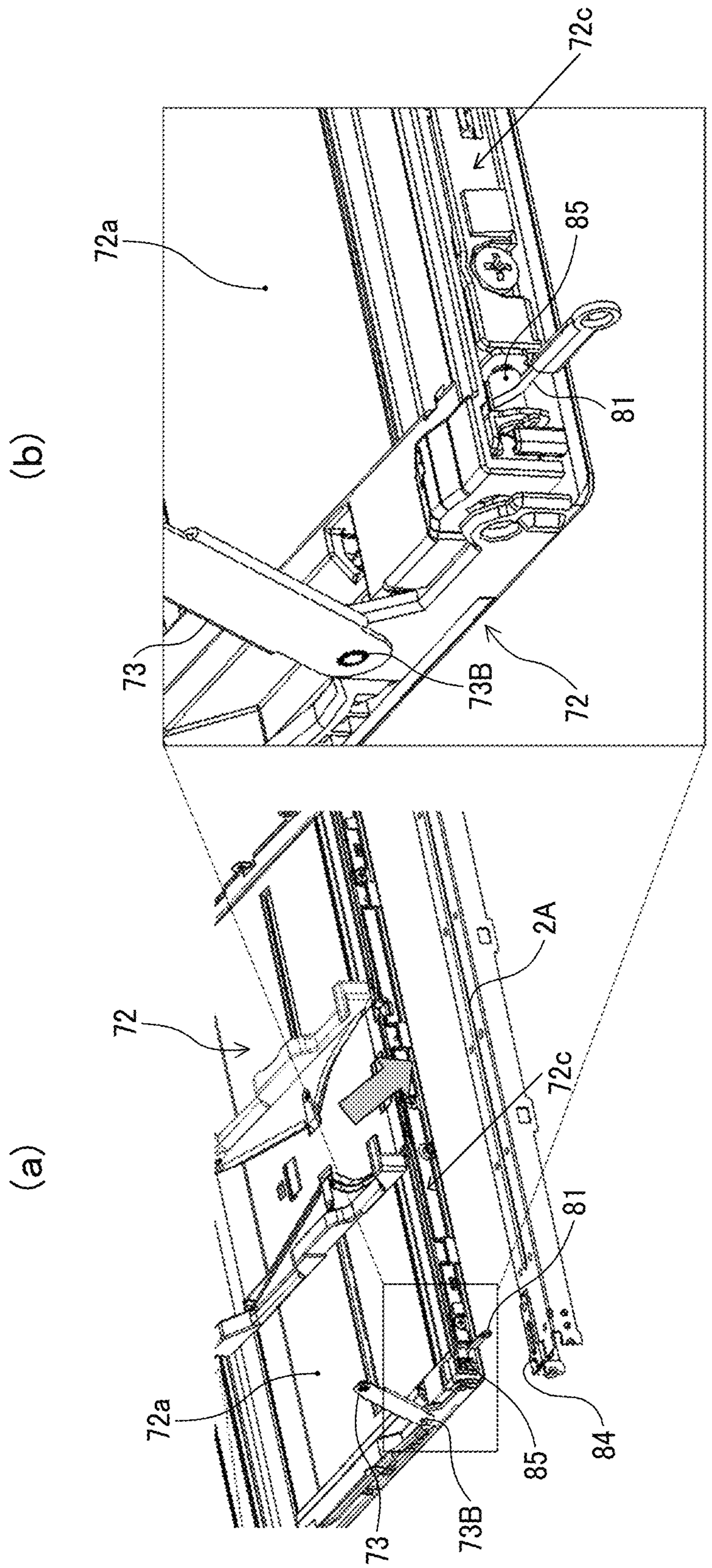
FIG. 7 is a perspective view of a portion where the wire extending from an end face of a base end of the bypass feeding tray.

In the present embodiment, particularly, as illustrated in parts (a) and (b) of FIG. 7, the wire 81 accommodated inside the bypass feeding tray 72 extends from the end face of the lower end (base end 72*c*) of the bypass feeding tray 72 to the inside of the image forming apparatus main body 2. That is, the portion of the wire 81 from the one end held by the wire holder 82 through the tension spring 83 to the lower end (base end 72*c*) of the bypass feeding tray 72 is accommodated inside the bypass feeding tray 72. The lower end (base end 72*c*) of the bypass feeding tray 72 is disposed at a position inside the image forming apparatus main body 2 or inside the openable member 71. Thus, a wire portion extending from the bypass feeding tray 72 to the inside of the image forming apparatus main body 2 or the inside of the openable member 71 is also hardly seen from the outside of the apparatus or hardly touched. Therefore, the disadvantage that the aesthetic appearance is impaired by the wire 81 and the disadvantage that damage occurs due to touch of the wire 81 by a person or an object are further reduced.

In the present embodiment, a pulley 85 is disposed on the route of the wire 81, specifically, near the base end 72*c* of the bypass feeding tray 72, and the wire 81 is stretched around the pulley 85. Adoption of such an arrangement in which the wire 81 is stretched around the pulley 85 improves the degree of freedom in disposition (degree of freedom of layout) of the wire 81. The pulley 85 is a stretching-around part around which the wire 81 is stretched. The pulley 85 may be a separate component from the bypass feeding tray 72 or may be integrated with a member as a constituent of the bypass feeding tray 72. The pulley 85 is also a direction changer that changes the direction of the wire 81.

Figure 8:
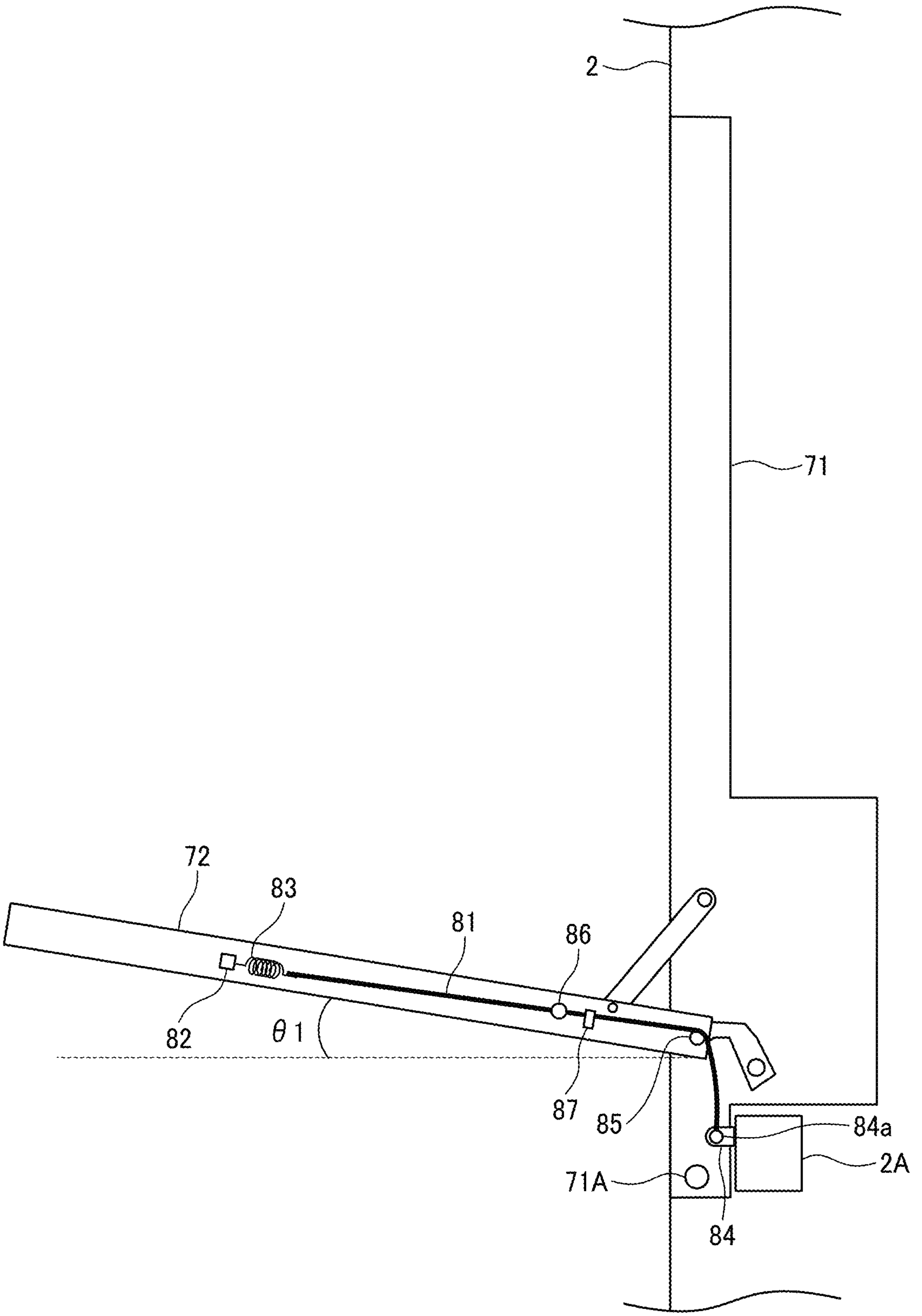
FIG. 8 is a schematic view of the bypass sheet feeder with the bypass feeding tray open and with the openable member closed.

FIG. 8 is an explanatory view schematically illustrating a configuration of the bypass sheet feeder 70 with the bypass feeding tray 72 open and with the openable member 71 closed.

Figure 9:
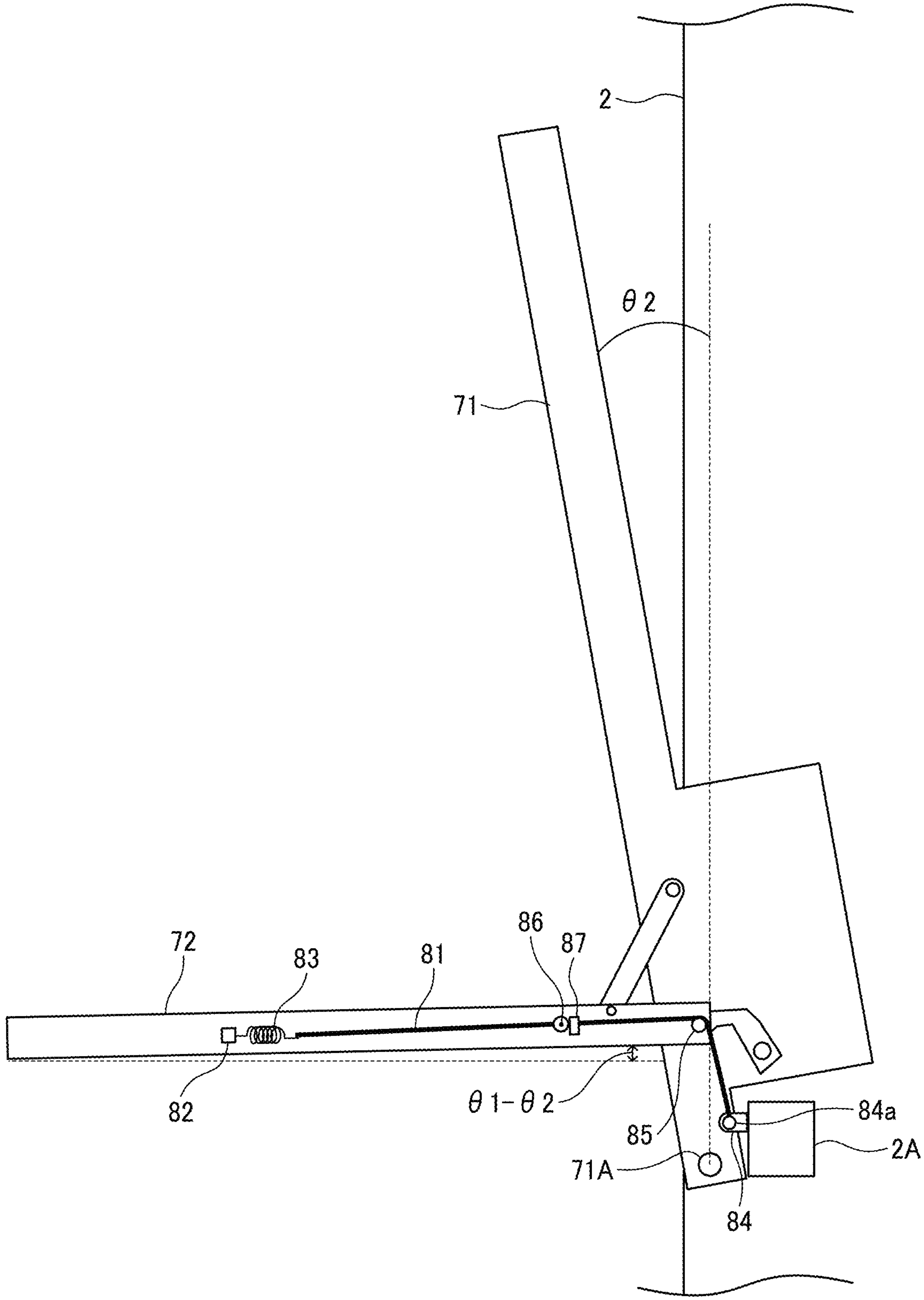
FIG. 9 is a schematic view of the bypass sheet feeder with the bypass feeding tray open and with the openable member partially opened.

FIG. 9 is an explanatory view schematically illustrating a configuration of the bypass sheet feeder 70 with the bypass feeding tray 72 open and with the openable member 71 partially open.

Figure 10:
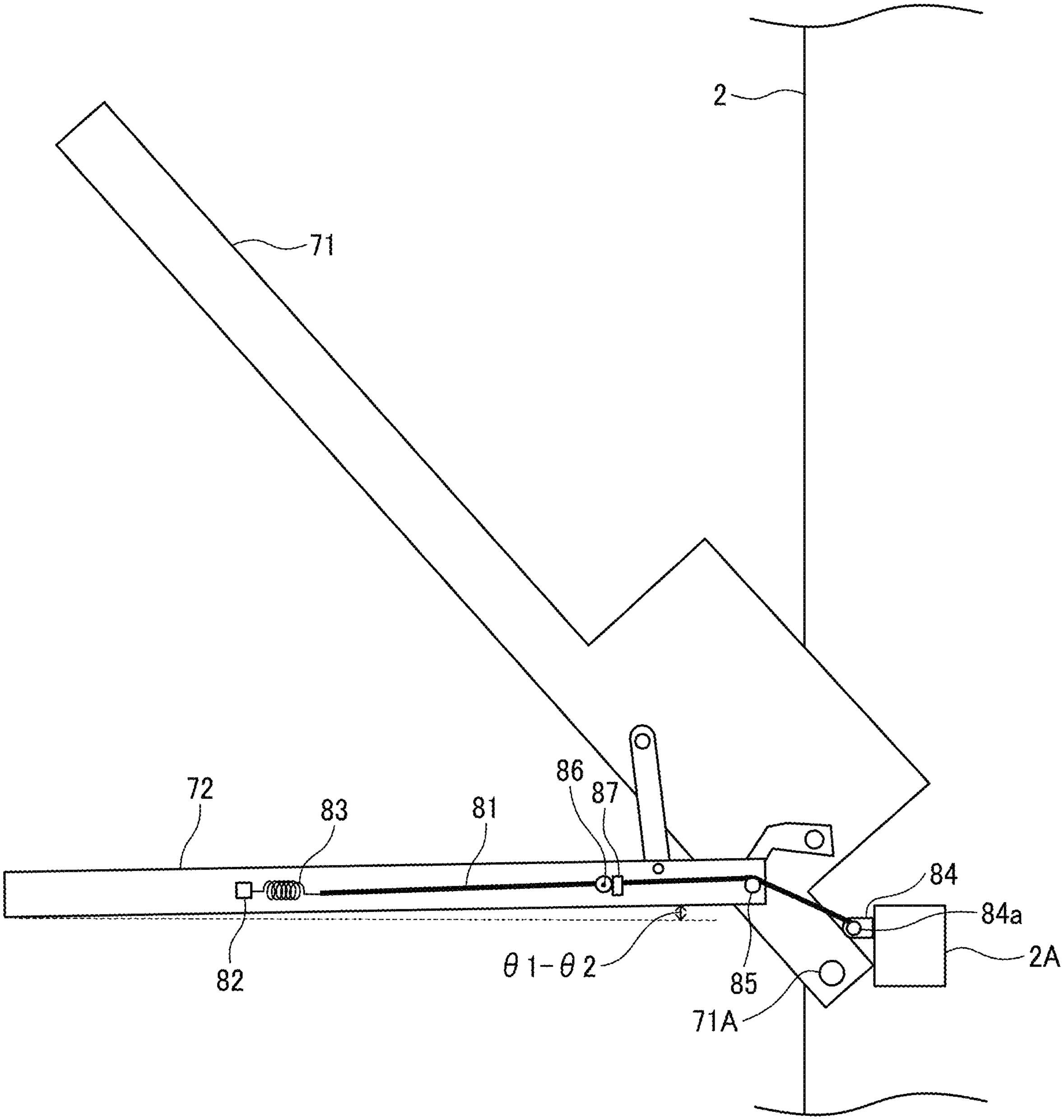
FIG. 10 is a schematic view of the bypass sheet feeder with the bypass feeding tray open and with the openable member completely open.

FIG. 10 is an explanatory view schematically illustrating a configuration of the bypass sheet feeder 70 with the bypass feeding tray 72 open and with the openable member 71 completely open.

If the openable member 71 is opened while a sheet is placed on the bypass feeding tray 72 remaining open, the bypass feeding tray 72 turns accordingly, so that the sheet placement face 72*a* of the bypass feeding tray 72 may be in a downward inclination state in which the leading end 72*b* of the bypass feeding tray 72 is located lower than the portion excluding the leading end 72*b* of the bypass feeding tray 72. When the inclination angle in the downward inclination state is too large (when the inclination angle exceeds the limit at which the sheet on the sheet placement face 72*a* does not slide out), a disadvantage that the sheet slides off the bypass feeding tray 72 occurs.

In the bypass sheet feeder 70 of the present embodiment when the openable member 71 shifts from the closed state where the openable member 71 is closed in an upright posture (see FIG. 8) to a state where the openable member 71 is open in an inclination posture (see FIG. 10) with the bypass feeding tray 72 open, tension of the wire 81 between the bypass feeding tray 72 and the wire bracket 84 of the image forming apparatus main body 2 prevents the bypass feeding tray 72 from turning along with the opening of the openable member 71. As a result, due to the tension of the wire 81 between the bypass feeding tray 72 and the wire bracket 84, the sheet placement face 72*a* of the bypass feeding tray 72 is kept in any one of an upward inclination state, a horizontal state, and a slightly downward inclination state. In the upward inclination state, the leading end 72*b* of the bypass feeding tray 72 is located higher than a portion excluding the leading end 72*b* of the bypass feeding tray 72. In the slightly downward inclination state, the leading end 72*b* of the bypass feeding tray 72 is located lower than the portion excluding the leading end 72*b* of the bypass feeding tray 72 at the limit at which the sheet on the sheet placement face 72*a* does not slide out. Note that in the slightly downward inclination state, the sheet placement face 72*a* of the bypass feeding tray 72 preferably has a range not more than 15 degrees downward with respect to the horizontal plane, and more preferably a range not more than 10 degrees downward with respect to the horizontal plane. As a result, as illustrated in FIG. 10, even if the openable member 71 is opened with the bypass feeding tray 72 open, the sheet placement face 72*a* of the bypass feeding tray 72 is kept in a substantially horizontal state. Thus, the disadvantage that the sheet slides off the bypass feeding tray 72 is solved.

Figure 11:
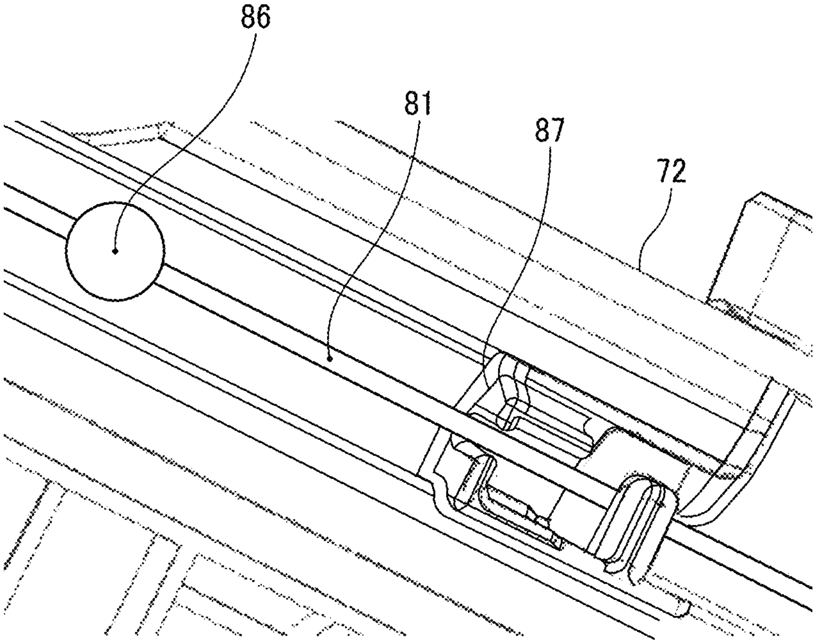
FIG. 11 is an enlarged view of a sphere stopper with which the wire is provided and a stopper with which the bypass feeding tray is provided.
Figure 12:
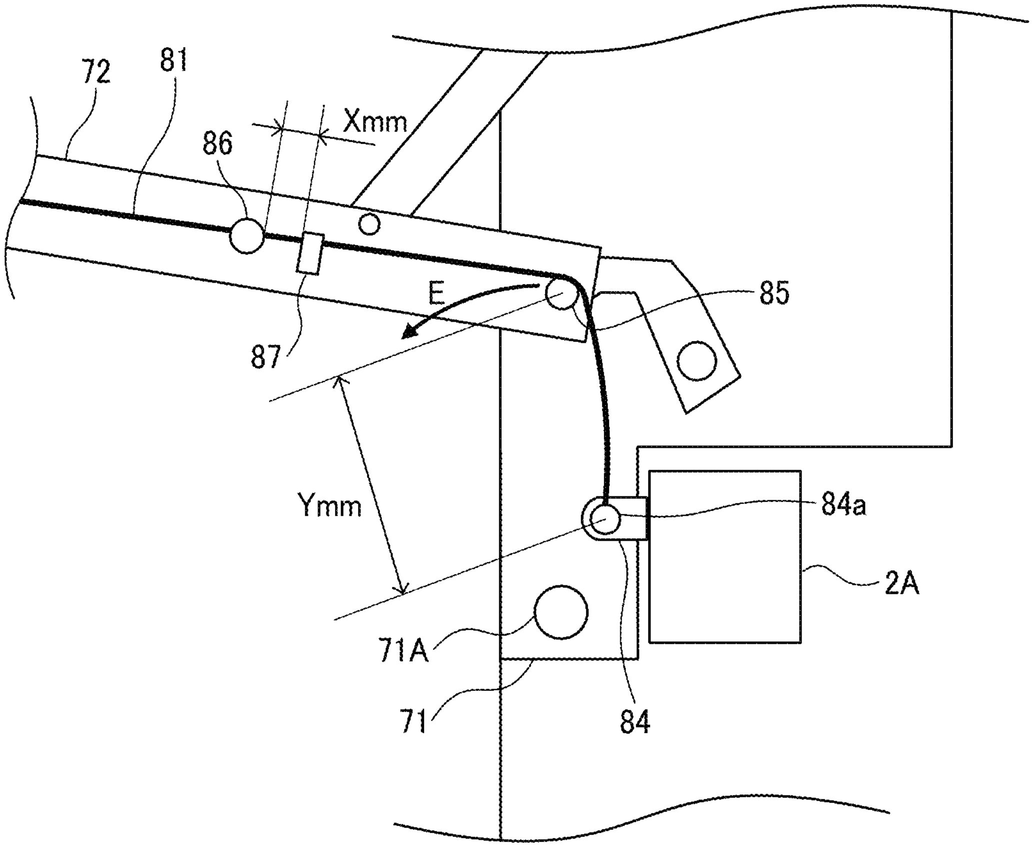
FIG. 12 is a schematic view of the wire with the bypass feeding tray open and with the openable member closed (illustrated in FIG. 8)

Specifically, as illustrated in FIG. 11, the wire 81 of the present embodiment is provided with a sphere stopper 86 as an abutment part at a wire portion inside the bypass feeding tray 72. With the bypass feeding tray 72 open and with the openable member 71 closed (the states in FIG. 8), as illustrated in FIG. 12, the sphere stopper 86 does not abut on a stopper 87 with which the bypass feeding tray 72 is provided, so that the wire 81 is loose. That is, with the bypass feeding tray 72 open and with the openable member 71 closed, the turning of the bypass feeding tray 72 is restricted by the tray stopper 76, whereby the bypass feeding tray 72 is kept in the open state. Therefore, the tension of the wire 81 does not contribute to the keeping of the bypass feeding tray 72 in the open state.

However, in the present embodiment, because the tension spring 83 is disposed at the one end of the wire 81, the looseness of the wire 81 is resolved by the biasing force (tensile force) of the tension spring 83. That is, even with the wire 81 loose due to no abutment between the sphere stopper 86 and the stopper 87 of the bypass feeding tray 72, tension in accordance with the biasing force (tensile force) of the tension spring 83 is applied to the wire 81. Then, the one end of the wire 81 is pulled by the biasing force (tensile force) of the tension spring 83, so that the sphere stopper 86 moves to the one end side of the wire 81, namely, a side away from the stopper 87 of the bypass feeding tray 72 and does not abut on the stopper 87.

As illustrated in FIG. 12, the route length of the wire 81 between the sphere stopper 86 and the stopper 87 at this time is defined as X [mm], and the route length of the wire 81 between the pulley 85 around which the wire 81 is stretched and the boss 84*a* of the wire bracket 84 holding the other end of the wire 81 at this time is defined as Y [mm].

When the openable member 71 is opened with the bypass feeding tray 72 remaining open from the state where the bypass feeding tray 72 is open and the state where the openable member 71 is closed (states in FIG. 8), the bypass feeding tray 72 turns in a direction where the leading end 72*b* of the sheet placement face 72*a* is lowered along with the turning of the openable member 71. As a result, the angle formed by the sheet placement face 72*a* and the horizontal plane gradually decreases from θ1 in the open state in FIG. 8 and approaches 0.

At this time, because the pulley 85 around which the wire 81 is stretched is supported by the openable member 71, the pulley 85 turns around the support shaft 71A of the openable member 71 as indicated by an arrow E in the figure along with the turning of the openable member 71. In the present embodiment, the direction where the pulley 85 moves due to the turning is a direction away from the boss 84*a* of the wire bracket 84 holding the other end of the wire 81 stretched around the pulley 85. Therefore, when the openable member 71 is opened with the bypass feeding tray 72 open, the route length of the wire 81 between the boss 84*a* of the wire bracket 84 and the pulley 85 becomes longer due to the movement of the pulley 85 turning about the support shaft 71A of the openable member 71. As a result, the wire 81 is gradually pulled toward the other end side (boss 84*a* side), and the sphere stopper 86 of the wire 81 moves in a direction close to the stopper 87 of the bypass feeding tray 72.

Figure 13:
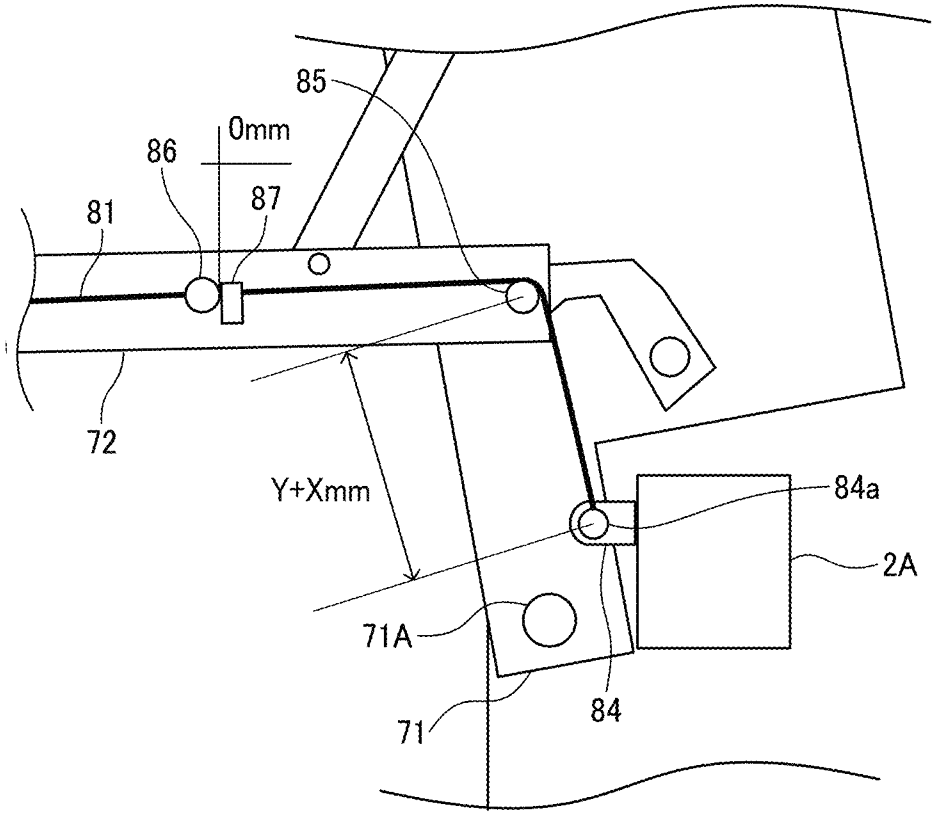
FIG. 13 is a schematic view of the wire with the bypass feeding tray open and with the openable member partially open (illustrated in FIG. 9)

Then, when the openable member 71 is opened with the bypass feeding tray 72 open to the state illustrated in FIG. 9, the inclination angle of the openable member 71 becomes θ2 with respect to the vertical direction, and the sphere stopper 86 of the wire 81 abuts on the stopper 87 of the bypass feeding tray 72 as illustrated in FIG. 13. As a result, the route length of the wire 81 between the boss 84*a* of the wire bracket 84 and the pulley 85 becomes Y+X, and cannot be made longer due to the tension of the wire 81 (tension of the wire portion between the other end of the wire 81 and the sphere stopper 86). At this time, as illustrated in FIG. 9, the sheet placement face 72*a* of the bypass feeding tray 72 is inclined by θ1−θ2 with respect to the horizontal plane, and is in an approximately horizontal state (a state where θ1−θ2 is substantially 0), so that the sheet does not slide off the bypass feeding tray 72. Note that θ1−θ2 is preferably in a range where the sheet placement face 72*a* of the bypass feeding tray 72 has not more than 15 degrees with respect to the horizontal plane, and more preferably in a range where the sheet placement face 72*a* has not more than 10 degrees with respect to the horizontal plane.

Then, when the bypass feeding tray 72 is further opened from the state in FIG. 9 to the state in which the openable member 71 is completely opened (the state in FIG. 10), the pulley 85 around which the wire 81 is stretched tends to turn along with the turning of the openable member 71. However, due to the tension of the wire 81, the pulley 85 cannot move in the direction away from the boss 84*a* of the wire bracket 84 holding the other end of the wire 81. Therefore, when the openable member 71 is opened from the state in FIG. 9 to the state in FIG. 10, the bypass feeding tray 72 is turned in the closing direction with respect to the openable member 71 by the two link members 73 and 74 such that the route length of the wire 81 between the boss 84*a* of the wire bracket 84 and the pulley 85 is kept.

Thus, when the openable member 71 is further opened from the state in FIG. 9 to the state in FIG. 10 with the bypass feeding tray 72 open, the movement of the bypass feeding tray 72 in which the leading end 72*b* of the sheet placement face 72*a* is lowered along with the turning of the openable member 71 is offset by the movement of the bypass feeding tray 72 in which the bypass feeding tray is closed with respect to the openable member 71 due to the tension of the wire 81. As a result, even if the openable member 71 is opened to the state in FIG. 10 with the bypass feeding tray 72 open, the sheet placement face 72*a* of the bypass feeding tray 72 is substantially kept inclined by θ1−θ2 with respect to the horizontal plane as illustrated in FIG. 10 and is kept in a substantially horizontal state. Thus, the sheet does not slide off the bypass feeding tray 72.

Figure 14:
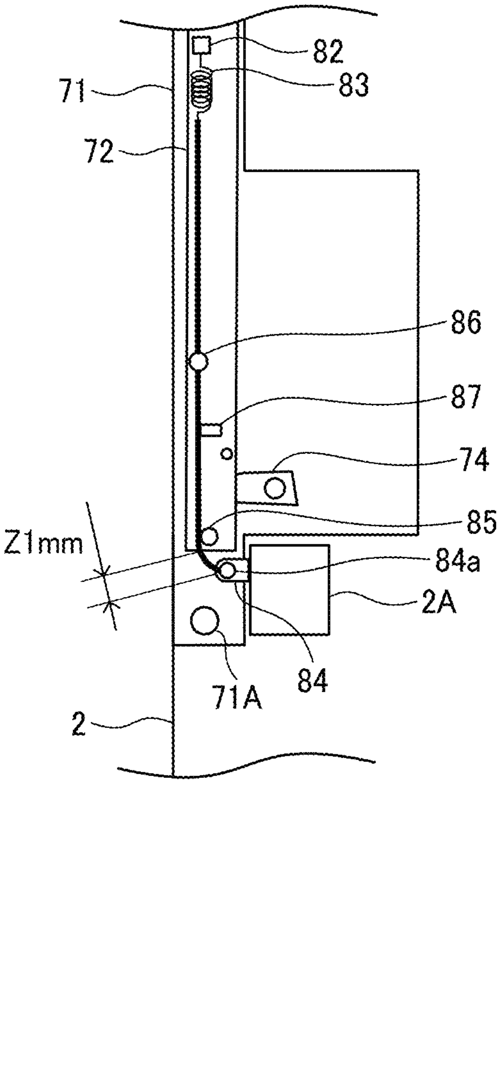
FIG. 14 is a schematic view of the wire with the bypass feeding tray closed and with the openable member closed.

FIG. 14 is an explanatory view of the wire 81 with the bypass feeding tray 72 closed and with the openable member 71 closed.

Figure 15:
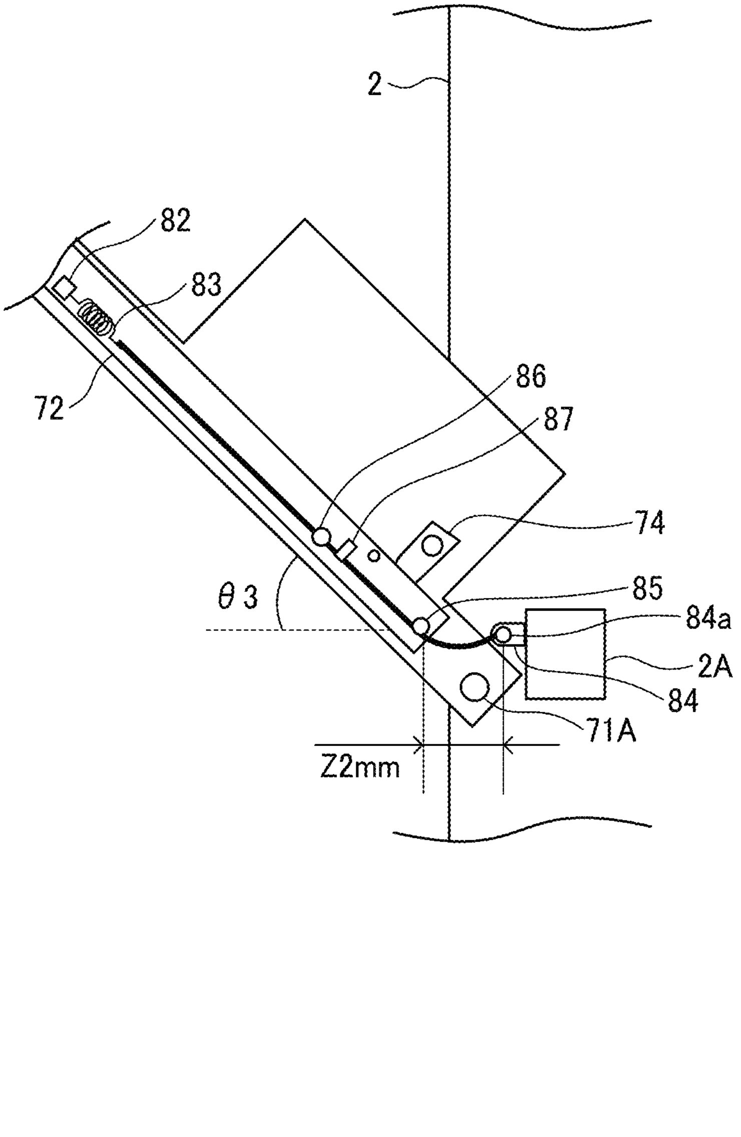
FIG. 15 is a schematic view of the wire with the bypass feeding tray closed and the openable member completely open.

FIG. 15 is an explanatory view of the wire 81 with the bypass feeding tray 72 closed and the openable member 71 completely open.

The bypass feeding tray 72 in the present embodiment is turned by the link members 73 and 74. Thus, with the bypass feeding tray 72 closed, as illustrated in FIG. 14, the base end 72*c* of the bypass feeding tray 72 is lower in comparison with the state where the bypass feeding tray 72 is open. Therefore, the pulley 85 disposed near the base end 72*c* of the bypass feeding tray 72 is closer to the boss 84*a* of the wire bracket 84 holding the other end of the wire 81 with the bypass feeding tray 72 closed in comparison with the state where the bypass feeding tray 72 is open. Therefore, the wire 81 is loose accordingly.

As illustrated in FIG. 14, with the bypass feeding tray 72 closed and with the openable member 71 closed, the route length of wire 81 between the pulley 85 around which the wire 81 is stretched and the boss 84*a* of the wire bracket 84 holding the other end of the wire 81 at this time is defined as Z1 [mm]. As illustrated in FIG. 15, with the bypass feeding tray 72 closed and with the openable member 71 open to the maximum, the inclination angle of the openable member 71 is θ3 with respect to the horizontal direction, and the route length of wire 81 between the pulley 85 around which the wire 81 is stretched and the boss 84*a* of the wire bracket 84 holding the other end of the wire 81 at this time is defined as Z2 [mm].

In the present embodiment, the wire 81 is loose in both the state of FIG. 14 and the state of FIG. 15, namely, both Z1 and Z2 are shorter than Y. Such an arrangement can be implemented, for example, by appropriately setting the position of the boss 84*a* of the wire bracket 84 holding the other end of the wire 81. With such an arrangement, both Z1 and Z2 are shorter than Y. Thus, with the bypass feeding tray 72 closed, the wire 81 can be kept in the loose state (i.e., a state of no abutment between the sphere stopper 86 and the stopper 87) at all times. As a result, when the openable member 71 is opened and closed with the bypass feeding tray 72 remaining closed, the tension of the wire 81 does not affect the bypass feeding tray 72.

In the present embodiment, with the bypass feeding tray 72 closed, both Z1 with the openable member 71 closed and Z2 with the openable member 71 open are shorter than Y with the openable member 71 open from the state where the openable member 71 is closed, and thus the wire 81 is loose accordingly. In the present embodiment, the looseness of the wire 81 can also be solved with the tension spring 83.

According to the bypass sheet feeder 70 of the present embodiment, the other end of the wire 81 held on the image forming apparatus main body 2 side is preferably attached to a portion not linked with the turning of the openable member 71 or a portion smaller in amount of turning than the openable member 71 when the openable member 71 is turned. Further, when the openable member 71 shifts from the closed state to the open state with the bypass feeding tray 72 open, the angle of θ1−θ2 when X is equal to 0 is preferably an angle at which the sheet on the sheet placement face 72*a* does not slide off. Furthermore, when the bypass feeding tray 72 is closed, each of Z1 in the closed state of the openable member 71 and Z2 in the open state of the openable member 71 is preferably shorter than Y in the closed state of the openable member 71 when the bypass feeding tray 72 is open.

First Modification

Next, a modification (hereinafter, referred to as a "first modification") of the bypass sheet feeder 70 in the above-described embodiment will be described.

A bypass sheet feeder 70 of the first modification is different from the above-described embodiment in the disposition of a boss 84*a* as a second end holder holding the other end of a wire 81. Other configurations are similar to the configurations of the above-described embodiment, and thus description thereof is not given.

Figure 16:
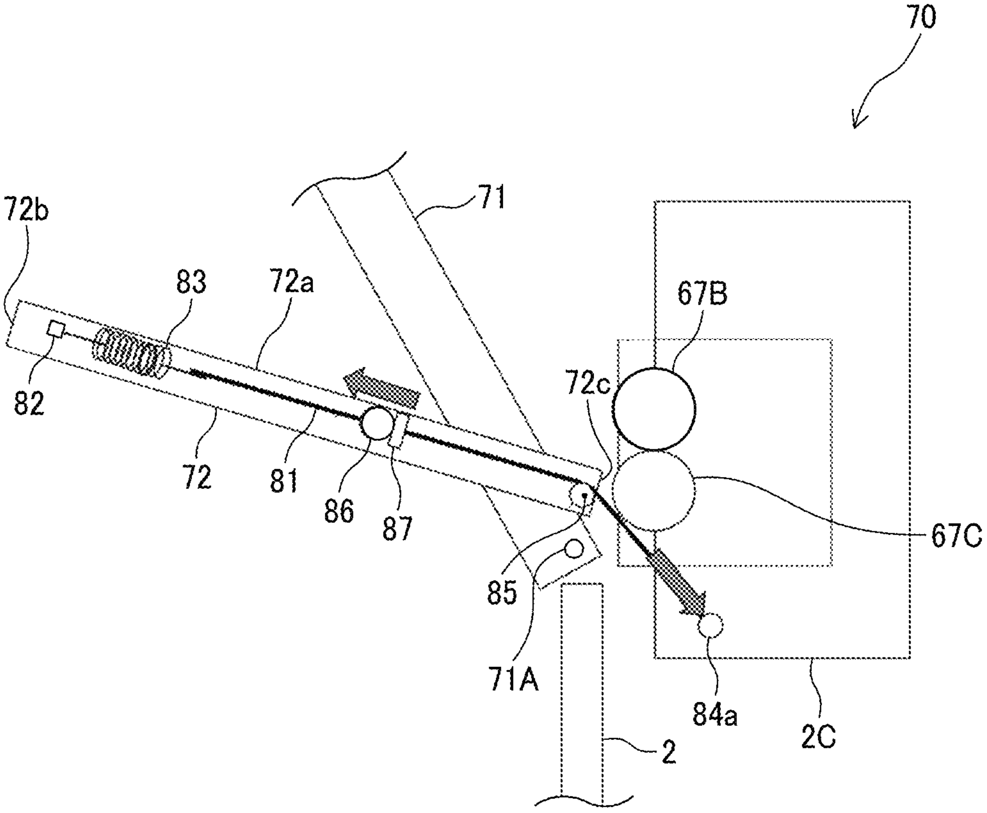
FIG. 16 is a schematic view of a bypass sheet feeder according to a first modification of the embodiment of the present disclosure.

FIG. 16 is an explanatory view schematically illustrating the bypass sheet feeder 70 according to the first modification.

In the first modification, a wire bracket 84 is attached not to a stay member 2A but to a main body side plate 2C that an image forming apparatus main body 2 has. The other end of the wire 81 is attached to the boss 84*a* of the wire bracket 84.

Also in the first modification, similarly to the above-described embodiment, when an openable member 71 shifts from a closed state where the openable member 71 is closed in an upright posture to a state where the openable member 71 is open in an inclination posture with the bypass feeding tray 72 open, as illustrated in FIG. 16, the tension of the wire 81 between the bypass feeding tray 72 and the wire bracket 84 of the image forming apparatus main body 2 prevents the bypass feeding tray 72 from turning along with the opening of the openable member 71. As a result, due to the tension of the wire 81 between the bypass feeding tray 72 and the wire bracket 84, a sheet placement face 72*a* of the bypass feeding tray 72 is kept in any one of an upward inclination state, a horizontal state, and a slightly downward inclination state. In the upward inclination state, a leading end 72*b* of the bypass feeding tray 72 is located higher than a portion excluding the leading end 72*b* of the bypass feeding tray 72. In the slightly downward inclination state, the leading end 72*b* of the bypass feeding tray 72 is located lower than the portion excluding the leading end 72*b* of the bypass feeding tray 72 at the limit at which the sheet on the sheet placement face 72*a* does not slide out. As a result, as illustrated in FIG. 16, even if the openable member 71 is opened with the bypass feeding tray 72 open, the sheet placement face 72*a* of the bypass feeding tray 72 is kept in a substantially horizontal state. Thus, a disadvantage that a sheet slides off the bypass feeding tray 72 is solved.

The wire 81 of the first modification has a wire portion L accommodated in the bypass feeding tray 72, with the bypass feeding tray 72 open. The wire portion L at least ranges from the one end held by a wire holder 82 through a tension spring 83 to the inside of the image forming apparatus main body 2 or the inside of the openable member 71. With this arrangement, similarly to the above-described embodiment, all or most of a portion of the wire 81 disposed outside the image forming apparatus is hidden in the bypass feeding tray 72. Thus, the wire 81 is less likely to be noticed by the user, resulting in reduction of a disadvantage that the aesthetic appearance is impaired due to expose of the wire 81 to the outside of the apparatus. Further, reduced can be a disadvantage that damage occurs due to touch of the wire 81 by a person or an object.

Second Modification

Next, another modification (hereinafter, referred to as a "second modification") of the bypass sheet feeder 70 according to the above-described embodiment will be described.

A bypass sheet feeder 70 of the second modification also different from the above-described embodiment in the disposition of a boss 84*a* as a second end holder holding the other end of a wire 81. Other configurations are similar to the configurations of the above-described embodiment, and thus description thereof is not given.

Figure 17:
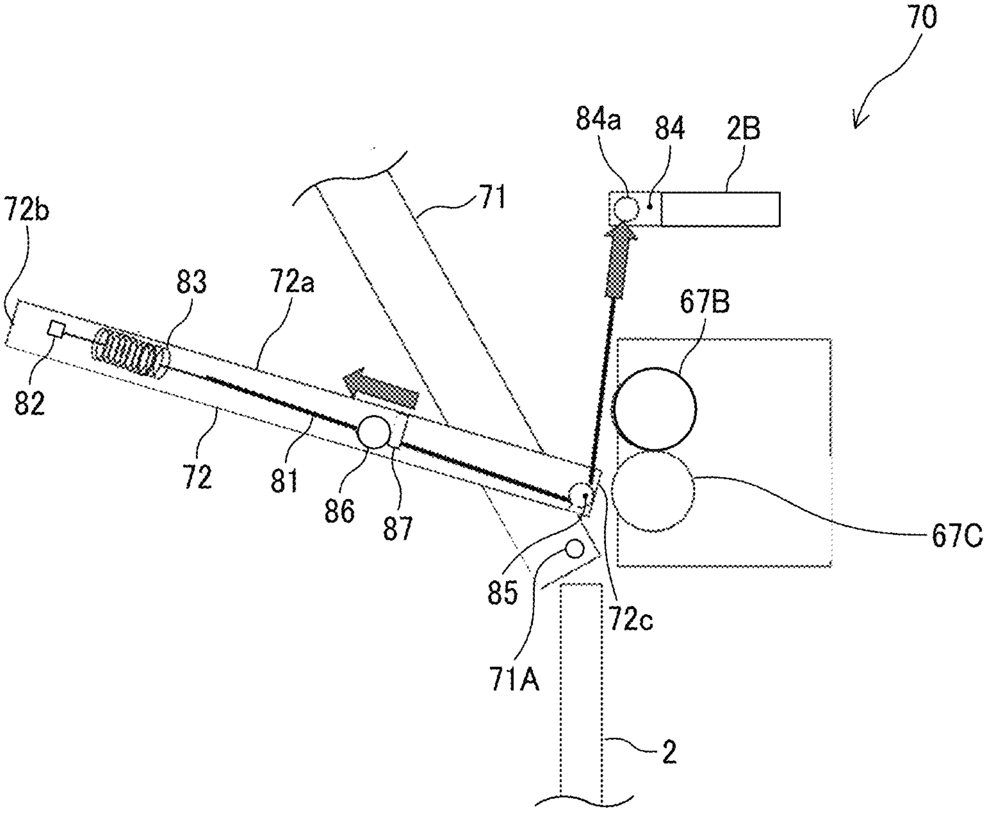
FIG. 17 is a schematic view of a bypass sheet feeder according to a second modification of the embodiment of the present disclosure.

FIG. 17 is an explanatory view schematically illustrating the bypass sheet feeder 70 according to the second modification.

In the second modification, a wire bracket 84 is attached to a stay member 2B attached between main body side plates that an image forming apparatus main body 2 above a feed roller 67B and a reverse roller 67C included in the bypass sheet feeder 70. The other end of the wire 81 is attached to the boss 84*a* of the wire bracket 84.

Also in the second modification, similarly to the above-described embodiment, when an openable member 71 shifts from a closed state where an openable member 71 is closed in an upright posture to an open state where the openable member 71 is open in an inclination posture with the bypass feeding tray 72 open, as illustrated in FIG. 17, the tension of the wire 81 between the bypass feeding tray 72 and the wire bracket 84 of the image forming apparatus main body 2 prevents the bypass feeding tray 72 from turning along with the opening of the openable member 71. As a result, due to the tension of the wire 81 between the bypass feeding tray 72 and the wire bracket 84, a sheet placement face 72*a* of the bypass feeding tray 72 is kept in any one of an upward inclination state, a horizontal state, and a slightly downward inclination state. In the upward inclination state, a leading end 72*b* of the bypass feeding tray 72 is located higher than a portion excluding the leading end 72*b* of the bypass feeding tray 72. In the slightly downward inclination state, the leading end 72*b* of the bypass feeding tray 72 is located lower than the portion excluding the leading end 72*b* of the bypass feeding tray 72 at the limit at which a sheet on the sheet placement face 72*a* does not slide out. As a result, as illustrated in FIG. 17, even if the openable member 71 is opened with the bypass feeding tray 72 open, the sheet placement face 72*a* of the bypass feeding tray 72 is kept in a substantially horizontal state. Thus, a disadvantage that the sheet slides off the bypass feeding tray 72 is solved.

Further, in the second modification, with the bypass feeding tray 72 closed, a base end 72*c* of the bypass feeding tray 72 is lower in comparison with the state where the bypass feeding tray 72 is open. As a result, a pulley 85 disposed near the base end 72*c* of the bypass feeding tray 72 is located farther from the boss 84*a* of the wire bracket 84 holding the other end of the wire 81 with the bypass feeding tray 72 closed in comparison with the state where the bypass feeding tray 72 is open. Therefore, in the second modification, the looseness of the wire 81 with the bypass feeding tray 72 closed is smaller in comparison with the above-described embodiment, which facilitates the setting of a tension spring 83.

The wire 81 of the second modification has a wire portion L accommodated in the bypass feeding tray 72, with the bypass feeding tray 72 open. The wire portion L at least ranges from the one end held by a wire holder 82 through the tension spring 83 to the inside of the image forming apparatus main body 2 or the inside of the openable member 71. With this arrangement, similarly to the above-described embodiment, all or most of a portion of the wire 81 disposed outside the image forming apparatus is hidden in the bypass feeding tray 72. Thus, the wire 81 is less likely to be noticed by the user, resulting in reduction of a disadvantage that the aesthetic appearance is impaired due to expose of the wire 81 to the outside of the apparatus. Further, reduced can be a disadvantage that damage occurs due to touch of the wire 81 by a person or an object.

Third Modification

Next, still another modification (hereinafter, referred to as a "third modification") of the bypass sheet feeder 70 according to the above-described embodiment will be described.

A bypass sheet feeder 70 of the third modification is different from the above-described embodiment in the disposition of a tension spring for eliminating the looseness of a wire 81. The basic configuration of the third modification is similar to the basic configuration of the above-described embodiment, and thus the description overlapping with the above-described embodiment will not be appropriately given in the following description.

Figure 18:
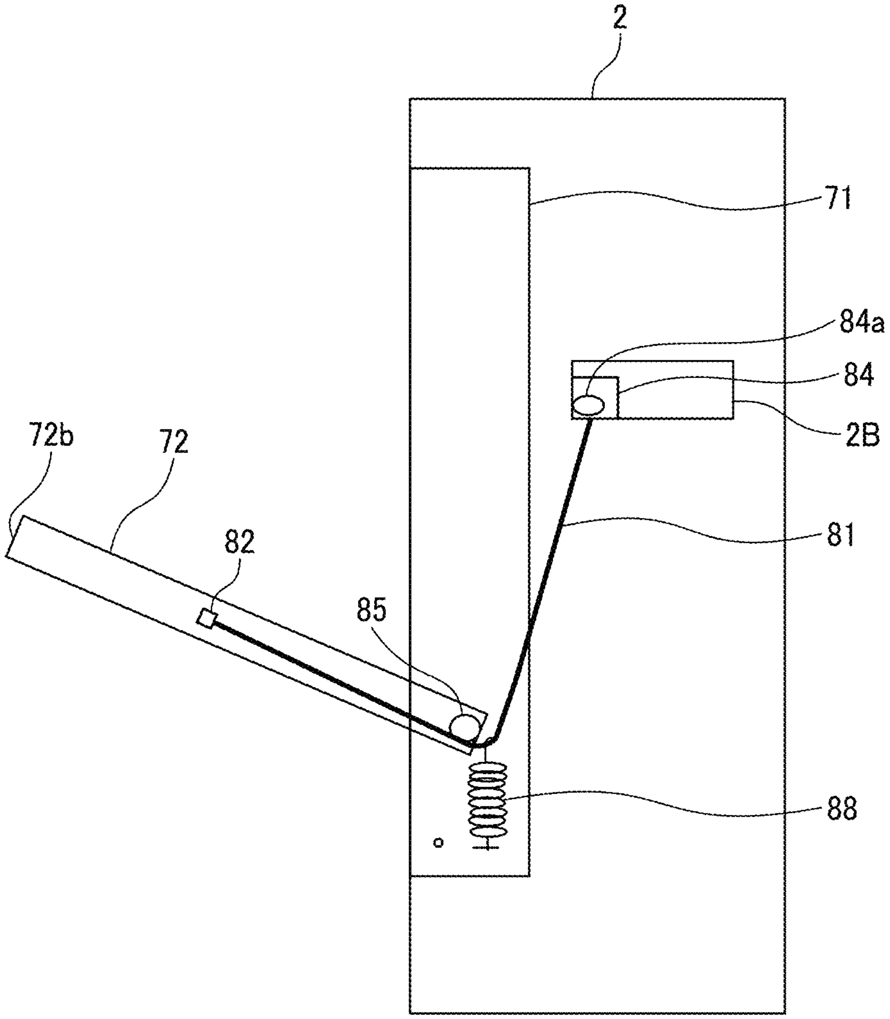
FIG. 18 is a schematic view of a wire with a bypass feeding tray open and with an openable member closed at a bypass sheet feeder according to a third modification of the embodiment of the present disclosure.

FIG. 18 is an explanatory view of the wire 81 with a bypass feeding tray 72 open and with an openable member 71 closed.

Figure 19:
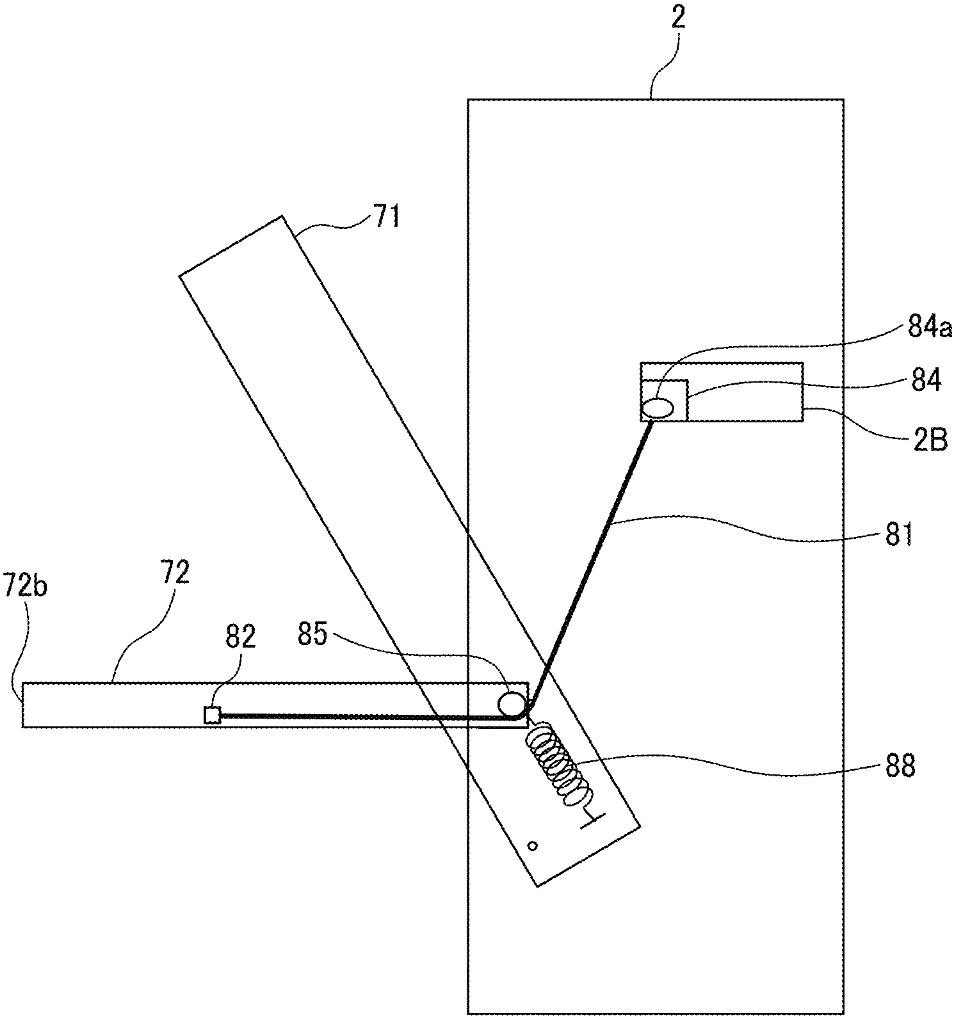
FIG. 19 is a schematic view of the wire with the bypass feeding tray open and with the openable member partially open in the third modification.

FIG. 19 is an explanatory view of the wire 81 with the bypass feeding tray 72 open and with the openable member 71 partially open.

In the third modification, the wire 81 has one end directly held by a wire holder 82 as a first end holder disposed inside the bypass feeding tray 72. The wire 81 has the other end held by a boss 84*a* of a wire bracket 84 as a second end holder of an image forming apparatus main body 2. As in the second modification 2 described above, the wire bracket 84 of the third modification is attached to a stay member 2B attached between main body side plates of the image forming apparatus main body 2 above a feed roller 67B and a reverse roller 67C of the bypass sheet feeder 70.

In the third modification, the function of the tension spring 83 of the above-described embodiment as a looseness reducer for the wire 81 is served by a tension spring 88 as a biasing member that biases an intermediate portion of the wire 81 downward (in the lateral direction with respect to the axial direction of the wire 81). Specifically, the tension spring 88 has one end hooked on a wire portion closer to the other end side (image forming apparatus main body 2 side) of the wire 81 than a pulley 85 disposed near a base end 72*c* of the bypass feeding tray 72 is. The tension spring 88 has the other end attached to a housing of the openable member 71.

Also in the third modification, when the bypass feeding tray 72 is opened with the openable member 71 closed (see FIG. 18), the bypass feeding tray 72 is kept in the open state. At this time, in the third modification, as illustrated in FIG. 18, the wire 81 is loose between the wire holder 82 of the bypass feeding tray 72 and the boss 84*a* of the wire bracket 84 of the image forming apparatus main body 2. That is, with the bypass feeding tray 72 open and with the openable member 71 closed, the turning of the bypass feeding tray 72 is restricted by a tray stopper 76, whereby the bypass feeding tray 72 is kept in the open state. Therefore, the tension of the wire 81 does not contribute to the keeping of the bypass feeding tray 72 in the open state.

However, in the third modification, the looseness of the wire 81 is eliminated due to the biasing force (tensile force) of the tension spring 88 hooked on the intermediate portion of the wire 81. That is, even with the wire 81 loose, tension in accordance with the biasing force (tensile force) of the tension spring 88 is applied to the wire 81.

Also in the third modification, similarly to the above-described embodiment, when the openable member 71 shifts from a closed state where the openable member 71 is closed in an upright posture to an open state where the openable member 71 is open in an inclination posture with the bypass feeding tray 72 open, as illustrated in FIG. 19, the tension of the wire 81 between the bypass feeding tray 72 and the wire bracket 84 of the image forming apparatus main body 2 prevents the bypass feeding tray 72 from turning along with the opening of the openable member 71. As a result, due to the tension of the wire 81 between the bypass feeding tray 72 and the wire bracket 84, a sheet placement face 72*a* of the bypass feeding tray 72 is kept in any one of an upward inclination state, a horizontal state, and a slightly downward inclination state. In the upward inclination state, a leading end 72*b* of the bypass feeding tray 72 is located higher than a portion excluding the leading end 72*b* of the bypass feeding tray 72. In the slightly downward inclination state, the leading end 72*b* of the bypass feeding tray 72 is located lower than the portion excluding the leading end 72*b* of the bypass feeding tray 72 at the limit at which a sheet on the sheet placement face 72*a* does not slide out. As a result, as illustrated in FIG. 19, even if the openable member 71 is opened with the bypass feeding tray 72 open, the sheet placement face 72*a* of the bypass feeding tray 72 is kept in a substantially horizontal state. Thus, a disadvantage that the sheet slides off the bypass feeding tray 72 is solved.

Figure 20:
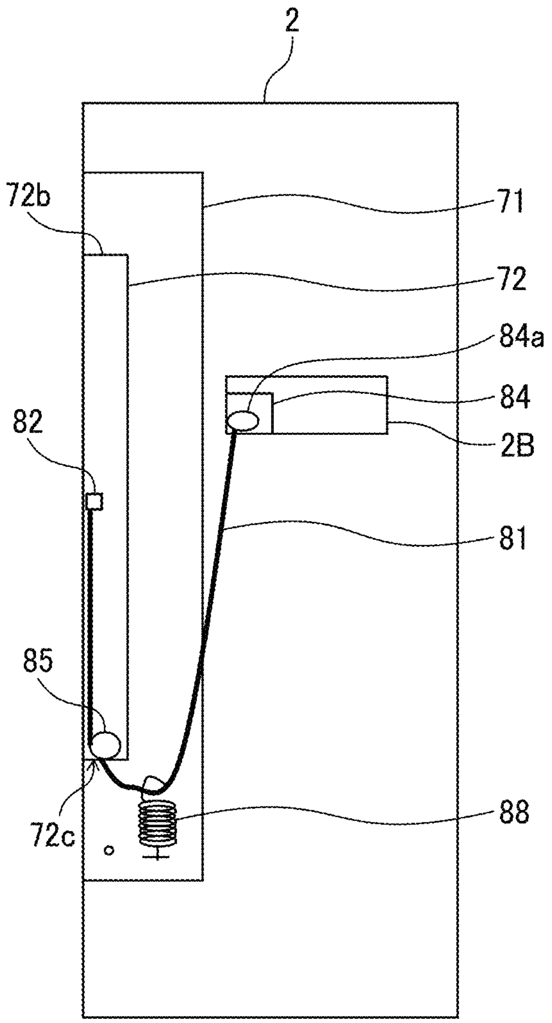
FIG. 20 is a schematic view of the wire with the bypass feeding tray closed and with the openable member closed in the third modification.

FIG. 20 is an explanatory view of the wire 81 with the bypass feeding tray 72 closed and with the openable member 71 closed in the third modification.

The bypass feeding tray 72 according to the third modification also has a configuration such that the wire 81 is kept in a loose state at all times with the bypass feeding tray 72 closed. As a result, when the openable member 71 is opened and closed with the bypass feeding tray 72 remaining closed, the tension of the wire 81 does not affect the bypass feeding tray 72. Also in the third modification, the looseness of the wire 81 with the bypass feeding tray 72 closed is eliminated with the tension spring 88.

In the above-described embodiment (including the above-described modifications, the same applies herein after), described has been an example in which the present invention is applied to the copier 1. The present invention, however, is not limited thereto, and thus may be applied to, for example, a printer.

The wire 81 of the third modification has a wire portion L accommodated in the bypass feeding tray 72, with the bypass feeding tray 72 open. The wire portion L at least ranges from the one end held by the wire holder 82 to the inside of the image forming apparatus main body 2 or the inside of the openable member 71. With this arrangement, similarly to the above-described embodiment, all or most of a portion of the wire 81 disposed outside the image forming apparatus is hidden in the bypass feeding tray 72. Thus, the wire 81 is less likely to be noticed by the user, resulting in reduction of a disadvantage that the aesthetic appearance is impaired due to expose of the wire 81 to the outside of the apparatus. Further, reduced can be a disadvantage that damage occurs due to touch of the wire 81 by a person or an object.

The embodiment and effects described above are some examples, and for example, specific effects can be exhibited for each of the aspects below.

First Aspect

According to a first aspect, a bypass feeder (e.g., a bypass sheet feeder 70) that feeds a sheet (e.g., a sheet S) placed on a bypass feeding tray (e.g., a bypass feeding tray 72) to a sheet conveyance path (e.g., a sheet conveyance path R) of a main apparatus (e.g., an image forming apparatus main body 2) includes: an openable member (e.g., an openable member 71) attached to the main apparatus such that an upper portion of the openable member opens and closes with respect to the main apparatus; the bypass feeding tray attached to the openable member such that an upper portion (e.g., a leading end 72*b*) of the bypass feeding tray opens and closes with respect to the openable member; and a linear member (e.g., a wire 81) having an end held by a first end holder (e.g., a wire holder 82) of the linear member and another end held by a second end holder (e.g., a wire bracket 84) of the main apparatus. The linear member has a portion accommodated inside the bypass feeding tray, and the portion ranges from the end to an inside of the main apparatus.

In a bypass feeder in the related art, a linear member having one end held by a first end holder of a bypass feeding tray and another end held by a second end holder of a main apparatus has a portion disposed outside the main apparatus when the bypass feeding tray is open. More specifically, a portion from the one end of the linear member held on the bypass feeding tray to the inside of the main apparatus is disposed outside the main apparatus. Accordingly, a disadvantage such as damage may occur due to touch of the linear member by a person or an object.

In the present aspect, the portion of the linear member from the one end held on the bypass feeding tray to the inside of the main apparatus is accommodated inside the bypass feeding tray. Accordingly, all or most of a portion of the linear member disposed outside the apparatus can be hidden in the bypass feeding tray. As a result, such a disadvantage that damage occurs due to touch of the linear member by a person or an object can be reduced.

Second Aspect

In the bypass feeder according to the first aspect, the bypass feeding tray has a placement face (e.g., a sheet placement face 72*a*) on which the sheet is placed, and when the openable member shifts from a closed state to an open state with the bypass feeding tray open, tension of the linear member between the bypass feeding tray and the second end holder keeps the placement face of the bypass feeding tray in any one of an upward inclination state, a horizontal state, and a slightly downward inclination state. In the upward inclination state, the upper portion is located higher than a portion of the bypass feeding tray, the portion excluding the upper portion. In the slightly downward inclination state, the upper portion is located lower than the portion of the bypass feeding tray at a limit at which a sheet on the placement face (e.g., the sheet placement face 72*a*) does not slide out.

According to the second aspect, the bypass feeder can reduce, for example, a disadvantage that damage may occur on the linear member for keeping the placement face of the bypass feeding tray in a state such that the sheet does not slide out when the openable member shifts from the closed state to the open state with the bypass feeding tray open.

Third Aspect

In the bypass feeder according to the second aspect, when the openable member is closed with the bypass feeding tray open, an abutment part (e.g., a sphere stopper 86) of the linear member does not abut on a stopper (e.g., a stopper 87) of the bypass feeding tray. When the openable member is open with the bypass feeding tray open, the abutment part abuts on the stopper to tense the linear member between the first end holder and the second end holder and keep the placement face of the bypass feeding tray in any one of the upward inclination state, the horizontal state, and the slightly downward inclination state.

According to the third aspect, a configuration can be easily achieved that keeps the placement face of the bypass feeding tray in the state such that the sheet does not slide out when the openable member shifts from the closed state to the open state with the bypass feeding tray open.

Fourth Aspect

The bypass feeder according to any one of the first to third aspects further includes a looseness reducer (e.g., a tension spring 83 or a tension spring 88) to reduce looseness of the linear member.

According to the fourth aspect, the occurrence of looseness of the linear member can be reduced by the looseness reducer. Thus, the looseness reducer can prevent a disadvantage due to the looseness of the linear member, for example, a disadvantage that the loose linear member is out of the regular position or a disadvantage that the loose linear member comes into contact with a peripheral member.

Fifth Aspect

In the bypass feeder according to the fourth aspect, the looseness reducer is a biasing member (e.g., a tension spring 83 or a tension spring 88) to apply a biasing force to the linear member.

According to the fifth aspect, the looseness reducer can be implemented with a simple configuration.

Sixth Aspect

In the bypass feeder according to the fifth aspect, the biasing member is a tension member (e.g., a tension spring 83) disposed between the end of the linear member and the first end holder of the bypass feeding tray.

According to the sixth aspect, the looseness reducer can be disposed on the axis of the linear member, resulting in reduction of the disposition space for the looseness reducer.

Seventh Aspect

In the bypass feeder of the fourth or fifth aspect, the looseness reducer (e.g., a tension spring 88) is attached to the openable member.

According to the seventh aspect, an advantage that the degree of freedom of disposition of the looseness reducer is high can be obtained.

Eighth Aspect

In the bypass feeder according to any one of the first to seventh aspects, the linear member has a portion accommodated inside the bypass feeding tray, the portion ranging from the end of the linear member to a lower end (end face of a base end 72*c*) of the bypass feeding tray.

The lower end of the bypass feeding tray is typically disposed at a position inside the main apparatus. Thus, a portion of the linear member extending from the bypass feeding tray to the inside of the main apparatus is also in a state where the portion is hardly visible or in a state where the portion is hardly touched from the outside of the apparatus. Accordingly, a disadvantage that damage occurs due to touch of the linear member by a person or an object can be further reduced.

Ninth Aspect

The bypass feeder according to any one of the first to eighth aspects includes a pulley (e.g., pulley 85) around which the linear member is stretched.

According to the ninth aspect, the degree of freedom of disposition of the linear member (degree of freedom of layout) is improved.

Tenth Aspect

In the bypass feeder according to any one of the first to ninth aspects, the second end holder is a bracket (e.g., a wire bracket 84) attached to a structure (e.g., a stay member 2A, a stay member 2B, or a main body side plate 2C) of the main apparatus.

According to the tenth aspect, the degree of freedom of disposition of the other end of the linear member is enhanced.

Eleventh Aspect

According to an eleventh aspect, an image forming apparatus includes the bypass feeder according to any one of the first to tenth aspects.

According to the eleventh aspect, the image forming apparatus can be provided that reduces a disadvantage such as the occurrence of damage due to touch of the linear member of the bypass feeder by a person or an object.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A bypass feeder for feeding a sheet to an apparatus, the bypass feeder comprising:

an openable member to be attached to the apparatus such that an upper portion of the openable member opens and closes;

a bypass feeding tray attached to the openable member such that an upper portion of the bypass feeding tray opens and closes; and a linear member having a first end held by a first end holder of the bypass feeding tray and a second end held by a second end holder of the apparatus, the linear member having a portion accommodated inside the bypass feeding tray when the bypass feeding tray is open, the portion ranging from the first end to an inside of the apparatus or an inside of the openable member.

2. The bypass feeder according to claim 1, wherein the bypass feeding tray has a placement face on which the sheet is to be placed, and when the openable member shifts from a closed state to an open state with the bypass feeding tray open, tension of the linear member between the bypass feeding tray and the second end holder keeps the placement face of the bypass feeding tray in any one of an upward inclination state, a horizontal state, or a slightly downward inclination state, wherein in the upward inclination state, the upper portion is located higher than a portion of the bypass feeding tray, the portion excluding the upper portion, and in the slightly downward inclination state, the upper portion is located lower than the portion of the bypass feeding tray at a limit at which the sheet on the placement face does not slide out.

3. The bypass feeder according to claim 2, wherein when the openable member is closed with the bypass feeding tray open, an abutment part of the linear member does not abut on a stopper of the bypass feeding tray and the linear member is loose, wherein when the openable member is open with the bypass feeding tray open, the abutment part abuts on the stopper to tense the linear member between the first end holder and the second end holder and keep the placement face of the bypass feeding tray in any one of the upward inclination state, the horizontal state, or the slightly downward inclination state.

4. The bypass feeder according to claim 1, further comprising a looseness reducer to reduce looseness of the linear member.

5. The bypass feeder according to claim 4, wherein the looseness reducer is a biasing member to apply a biasing force to the linear member.

6. The bypass feeder according to claim 5, wherein the biasing member is a tension member disposed between the first end of the linear member and the first end holder of the bypass feeding tray.

7. The bypass feeder according to claim 4, wherein the looseness reducer is attached to the openable member.

8. The bypass feeder according to claim 1, wherein the linear member has a portion accommodated inside the bypass feeding tray, the portion ranging from the first end to a lower end of the bypass feeding tray.

9. The bypass feeder according to claim 1, further comprising a pulley, wherein the linear member is stretched around the pulley.

10. The bypass feeder according to claim 1, wherein the second end holder is a bracket attached to a structure of the apparatus.

11. An image forming apparatus comprising the bypass feeder according to claim 1.

* * * * *